(12) United States Patent
Perkin

(10) Patent No.: US 11,752,438 B2
(45) Date of Patent: *Sep. 12, 2023

(54) PLAYER ADJUSTMENT SCORING SYSTEM

(71) Applicant: DFS INNOVATIONS LLC, Carlsbad, CA (US)

(72) Inventor: Tom Perkin, San Marcos, CA (US)

(73) Assignee: DFS INNOVATIONS LLC, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/240,646

(22) Filed: Apr. 26, 2021

(65) Prior Publication Data
US 2021/0236943 A1 Aug. 5, 2021

Related U.S. Application Data

(63) Continuation of application No. 16/518,902, filed on Jul. 22, 2019, now Pat. No. 11,007,444.

(60) Provisional application No. 62/701,848, filed on Jul. 23, 2018.

(51) Int. Cl.
| | |
|---|---|
| A63F 13/828 | (2014.01) |
| A63F 13/65 | (2014.01) |
| A63F 13/25 | (2014.01) |
| A63F 13/20 | (2014.01) |

(52) U.S. Cl.
CPC ............ *A63F 13/828* (2014.09); *A63F 13/65* (2014.09); *A63F 13/20* (2014.09); *A63F 13/25* (2014.09); *A63F 2300/69* (2013.01); *A63F 2300/8052* (2013.01)

(58) Field of Classification Search
CPC ......... A63F 13/828; A63F 13/20; A63F 13/65
See application file for complete search history.

(56) References Cited

U.S. PATENT DOCUMENTS

| | | |
|---|---|---|
| 2007/0021165 A1 | 1/2007 | Ma et al. |
| 2013/0079073 A1 | 3/2013 | Sharifi |
| 2014/0045595 A1 | 2/2014 | Baschnagel, III |
| 2015/0057074 A1 | 2/2015 | Geller et al. |
| 2017/0319970 A1 | 11/2017 | Thorman |
| 2018/0001215 A1 | 1/2018 | Lazarus et al. |

OTHER PUBLICATIONS

U.S. Appl. No. 16/518,902, filed Jul. 22, 2019, Tom Perkin, US 2020-0023278 A1, Office Action dated Jul. 27, 2020 Notice of Allowance dated Jan. 22, 2021.

*Primary Examiner* — Omkar A Deodhar
(74) *Attorney, Agent, or Firm* — KOS IP Law LLP

(57) ABSTRACT

Systems and methods of conducting a fantasy sport contest are disclosed. According to some embodiments, the fantasy sport contest is provided for participants to join. The fantasy sport contest includes one or more fantasy teams where each fantasy team includes a multiplicity of real-life players. A player adjustment value (PAV) is determined for each of the real-life players. Accumulated statistics of the real-life player during real-life games are converted into a baseline fantasy score according to a baseline scoring system. The baseline fantasy score is adjusted according to the real-life player's PAV to produce an adjusted fantasy score of the real-life player.

38 Claims, 9 Drawing Sheets

Player's Baseline Fantasy Score  ×  Player's PAV  =  Player's Adjusted Fantasy Score

FIG. 4

PLAYER ADJUSTMENT SCORING SYSTEM

CROSS-REFERENCE TO RELATED APPLICATIONS

This application is a continuation of U.S. patent application Ser. No. 16/518,902, filed Jul. 22, 2019, which claims the benefit of U.S. Provisional Application No. 62/701,848 filed on Jul. 23, 2018, the disclosures of which are incorporated herein by reference.

TECHNICAL FIELD

The present disclosure generally relates to methods and systems of playing sports related fantasy games, and in particular, methods and systems of scoring in sports related fantasy games, as well as the fantasy games and contests that utilize methods and systems of scoring.

BACKGROUND

Fantasy sports contests are contests in which each participant acts as a fantasy team owner by selecting one or more real-life sports players to comprise their fantasy team.

Each owner's fantasy team generally competes against other participants' fantasy teams based on actual statistics generated by real-life players in real-life games during a fantasy sport contest.

Game rules and a scoring system may typically be established prior to the start of the contest and prior to the selection of real-life players by the participants. A total point scoring system awards a certain amount of fantasy points for each statistic accumulated in various categories for the fantasy contest. The statistics accumulated by the real-life players during the contest are converted into fantasy points according to the scoring system. The fantasy points for each real-life player in a fantasy team's lineup are added together to determine the fantasy team's total fantasy points. The team with the highest total fantasy points is declared a winner.

In conventional fantasy sports contests, every real-life player's accumulated statistics are weighted equally for purposes of converting statistics into fantasy points. Statistics are not adjusted. Fantasy points are not adjusted. Fantasy points are calculated based solely on the player's accumulated statistics during the interval, irrespective of said player's fantasy value or likelihood of accumulating statistics. Giving equal weight to all real-life players regardless of fantasy value results in significant disparities in fantasy value amongst real-life players. Star players having significantly more fantasy value than average players because they are likely to accumulate significantly more statistics and therefore score significantly more fantasy points.

In fantasy sports contests involving a draft, which may be referred to as draft contests, each participant in the fantasy league may take a turn in selecting a real-life player from a pool of real-life players in a certain order based on pre-selected criteria such as a lottery. Draft contests typically take place over several real-life games over the course of a sports league season. Fantasy sports contests that take place over several real-life games may be referred to as seasonal fantasy sports contests, seasonal fantasy contests or seasonal contests.

The scarcity of real-life players with high fantasy value creates unfairness in draft contests because each real-life player can only be owned by one participant in each fantasy league. Real-life players who are projected to accumulate more statistics during the contest and therefore score more fantasy points are more valuable fantasy players, and thus, tend to be drafted earlier. Thus, a participant with an earlier draft position may have a perceptive advantage over participants with later draft positions by being able to select real-life players with higher fantasy value.

The limited number of high fantasy value players also inherently limits the number of participants that can participate in the draft contest. If a draft contest has too many participants, the limited number of players with high fantasy value results in an even more significant advantage to owners assigned higher draft positions.

Some fantasy sport contests, which may be referred to as non-draft contests, allow the same real-life player to be selected by more than one participant in the contest. Thus, the same real-life player can be part of multiple fantasy teams within the same contest. A non-draft contest may include one participant up to an unlimited number of participants. Participants may select their fantasy lineup from the entire pool of real-life players. Real-life players are typically assigned a salary cap number prior to the selection of real-life players. Each participant's lineup selections are typically limited by a total salary cap and not disclosed to other participants until the contest starts.

Non-draft contests typically take place over a single real-life game for each real-life player, which takes place during a certain day, for sports such as baseball and basketball, or a set week of the regular season for games, such as football. Contests that take place over a single game for each real-life player may be referred to as daily fantasy sports contests or daily contests. The daily contest ends after each real-life player has finished playing the single game.

In existing fantasy sports scoring systems, the number of fantasy points a player can accumulate is relatively limited. There is a maximum amount of points that can be scored in any given play. Limits on big scores and swings make dramatic comebacks and swings relatively unlikely. This makes existing fantasy contests less exciting, and results in some participants who fall far behind in the contest losing interest before the contest is over.

Under the conventional approach, there is a limited number of fantasy viable real-life players, and fantasy player rankings and player's fantasy projections are widely publicized. Because of this, there is little skill or knowledge required to choose the optimal players or lineup for a fantasy team.

BRIEF DESCRIPTION OF THE DRAWINGS

Embodiments of the disclosure are illustrated by way of example and not limited to the figures of the accompanying drawings in which like references indicate similar elements.

FIG. 4 is a diagram demonstrating how a real-life player's adjusted fantasy score is determined from a player's baseline fantasy score and the player's PAV according to one embodiment.

DETAILED DESCRIPTION

Figure 1:
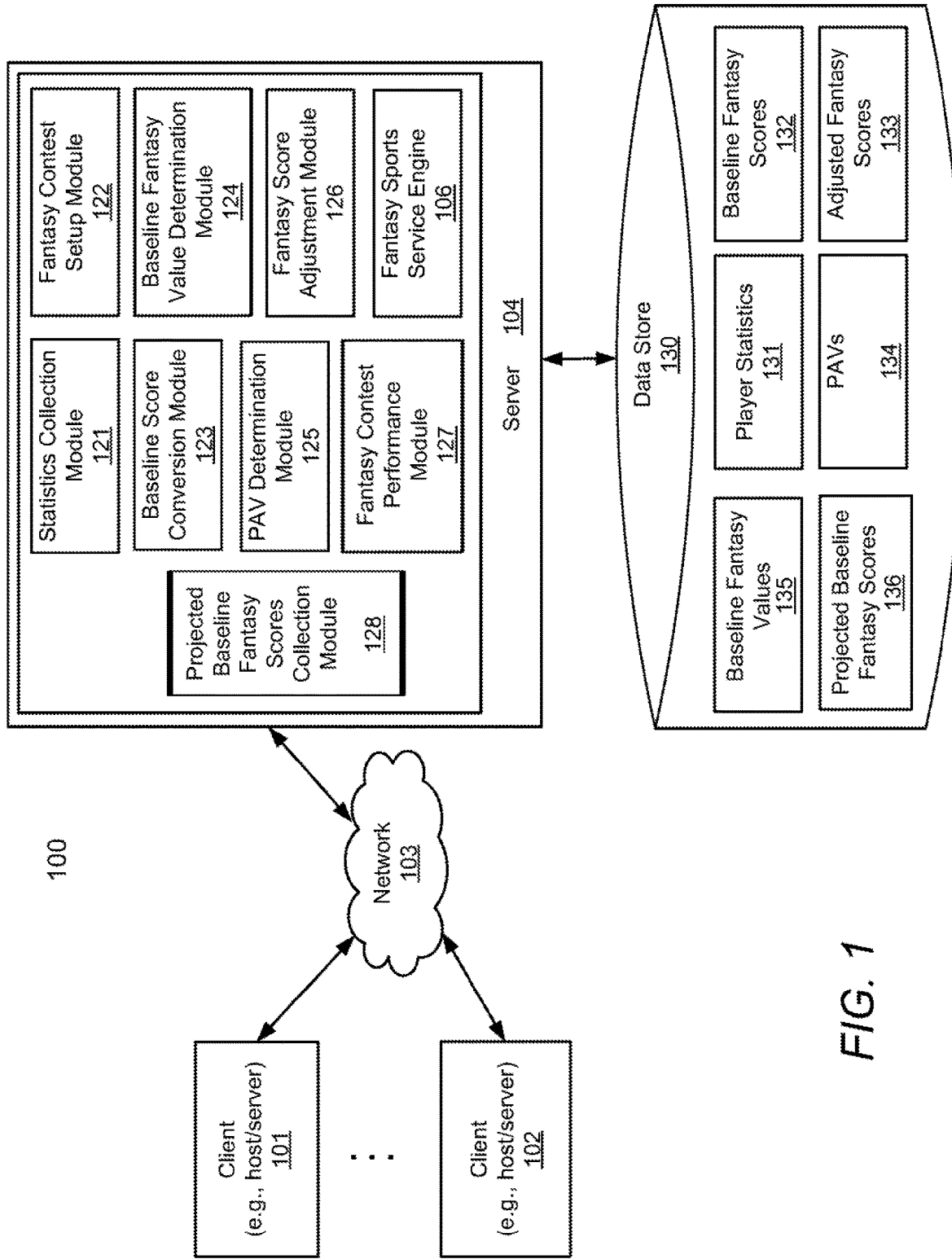
FIG. 1 is a block diagram illustrating a fantasy sport contest system according to one embodiment.

Various embodiments and aspects of the disclosure will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Some embodiments of the disclosure use a new scoring system for fantasy sports related games and contests, which may be referred to as player adjustment scoring system (PASS). PASS can individually adjust each real-life player's baseline fantasy score (e.g., baseline fantasy points or baseline statistics) up or down by a multiplier or function, which may be referred to as a player adjustment value (PAV), to arrive at the player's adjusted fantasy score (e.g., adjusted fantasy points or adjusted statistics). Baseline fantasy score can be a fantasy score that has not been adjusted. Baseline fantasy score can include baseline fantasy points as well as baseline statistics. Baseline fantasy points can be fantasy points that have not been adjusted. Baseline fantasy statistics can be fantasy statistics that have not been adjusted. Baseline fantasy values can be fantasy values that have not been adjusted. Adjusted fantasy values can be fantasy values that have been adjusted by PAVs. Adjusted fantasy score can be a fantasy score that has been adjusted by a PAV, and can include adjusted fantasy points or adjusted statistics. A variety of values or numbers that have not been adjusted may be referred to as baseline. Games implementing PASS use adjusted fantasy scores rather than baseline fantasy scores to determine a winner and rankings of participants in the contest. In contrast, conventional fantasy games use baseline fantasy scores to determine the winner. Conventional fantasy games do not adjust baseline fantasy scores. Baseline fantasy scores or fantasy scores that are not adjusted are typically referred to merely as fantasy points or statistics in conventional fantasy games.

A PAV can be determined for each real-life player prior to, during, or after the selection of real-life players by participants in the fantasy sports contest. PAVs may serve the purpose of making the adjusted fantasy values of real-life players more equal. PAVs may be determined in any way and by any method that serves this function. PAVs may remain constant over the entirety of the contest; however, the contest administrator can set the contest rules to allow for PAVs to change during the course of the contest. PAVs may be obtained from a third party, database, or data store, such as a website.

The participants in the fantasy game or contest can select real-life player(s) for their fantasy teams, and may take into account the PAV of each real-life player.

Real-life players accumulate statistics in real-life games. These statistics can be obtained from a data store or a third party, which can include a website that provides real-life player statistics in real-time, and converted into a baseline fantasy score according to the baseline scoring system.

During contests, each real-life player's PAV can be applied to the player's baseline fantasy score to calculate the player's adjusted fantasy score (AFS). By adjusting each real-life player's baseline fantasy points or statistics with PAVs, the adjusted fantasy value of real-life players may be partially or fully equalized. This results in a significantly larger pool of real-life players that are viable for fantasy contests.

In some embodiments, the adjusted fantasy score of each real-life player is summed up for the fantasy team, and the fantasy team with the highest total adjusted fantasy score is the winner. For contests with a multitude of players, the team with the second highest total adjusted fantasy score is awarded second place, and so forth.

Embodiments of the disclosure may also include any and all games and contests that utilize any and all versions of PASS. Games and contests utilizing PASS may include existing games and contests that utilize PASS as well as new games and contests that utilize PASS.

Some embodiments of the disclosure may be applied to a variety of fantasy sports, a variety of fantasy games, and a variety of fantasy formats. In addition, some embodiments of the disclosure may make possible a variety of new fantasy games and contests.

Baseline fantasy values may be determined by any methods, measures or objective or subjective factors related to how valuable the player is in the fantasy contest, including projected baseline fantasy scores, auction values, average draft positions, salary cap numbers, past statistics, and/or trade values. Projected baseline fantasy scores for each real-life player can be determined by applying the player's projected statistical output during the contest to the baseline scoring system.

There are a variety of methods of calculating or setting PAVs which can be used in games using PASS. PAVs can be determined by algorithm, formula or other means. For example, the PAV can be determined by a multiplier followed by one or more mathematical operations such as addition or subtraction. Alternatively, the administrator of the fantasy contest can set PAVs for each player at their discretion, with the intent of making adjusted fantasy values more equal.

PAVs, as well as baseline fantasy values, rankings, projected points, statistics, and other information and data used to calculate these values, can be obtained from a data store, third party, or another source, which can include a website. Moreover, PAVs, baseline fantasy values, rankings, projected points and other information and data can be calculated by a third party and incorporated into the contest.

Baseline scoring systems may be obtained from a third party or data store, such as a website. To better illustrate a total points baseline scoring system, in the sport of football, each touchdown scored by a real-life player translates to a certain number of baseline fantasy points, typically 6, for the fantasy team owner. Table 1 illustrates a typical baseline scoring system for an NFL fantasy football contest:

TABLE 1

| Offense Statistic (QB, RB, WR, TE, K): | Baseline Fantasy Score |
|---|---|
| Rushing or Receiving Touchdown | 6 |
| Fumble Recovery Touchdown | 6 |
| Passing Touchdown | 6 |
| Field Goal Made 0-49 yards: | 3 |
| Field Goal Made 50+ yards | 5 |
| Passing, Rushing or Receiving Two-Point Conversion | 2 |
| Rushing or Receiving | 1 per 10 yards |
| Passing | 1 per 25 yards |
| Extra Point | 1 |
| Fumble Lost | −2 |
| Interception | −2 |

In one embodiment, a PAV can be determined in any way that has any inverse relationship to the real-life player's baseline fantasy value by some measure. For example, the PAV can take the form of a multiplier equal to the inverse of the player's projected baseline fantasy points per game. In daily fantasy contests, the entirety of the contest typically consists of a single game for each real-life player. In a daily fantasy contest, for example, if a football player is projected to score 1.1 rushing touchdown and run for 85 yards in the game, this player's projected baseline fantasy score using Table 1 would be 1.1 rushing touchdown×6 points, plus 85 rushing yards×1 point per 10 yards, equals 6.6 plus 8.5, for a total projected baseline fantasy score of 15.1 points. This PAV for this player could then be determined to equal 1 divided by 15.1, or 0.0662251. If this player then accumulated statistics in the real-life game of 2 touchdowns and 150 yards, his baseline fantasy score would equal 2 touchdowns×6 points, plus 150 yards×1 point per 10 yards, equals 12 plus 15, for a total baseline fantasy score of 27. This player's adjusted fantasy score would be 27 baseline fantasy points×PAV 0.0662251, or 1.7880777 points.

In seasonal fantasy contests, the total projected fantasy points for the entirety of the contest can be divided by the number of games within the contest to determine PAV. For example, if a player is projected to score a total of 227 baseline fantasy points over the course of the 13 games within the seasonal fantasy contest, this player's PAV for the contest could be 227 divided by 13, which equals 17.46 projected baseline fantasy points per game. This player's PAV could then be determined to equal 1 divided by 17.46, or 0.05727.

In another embodiment, the PAV can be determined by dividing the projected score of the highest ranked player within the subject player's position group such as running back, by the subject player's projected baseline fantasy score. For example, if Todd Gurley is projected to score the most baseline fantasy points of all running backs, for example 300 points over the course of the season, Gurley's PAV may be 300 divided by 300 or (1.0×). If the next most valuable fantasy running back was projected to score 280 points, his PAV may be a PAV of 300 divided by 280, or (1.07×). This method can also be used for daily fantasy contests by substituting projected points for a single game to calculate a daily PAV for a single game.

To make the adjusted fantasy scores higher and more fun for participants, the PAV can be the inverse of the projected baseline fantasy points as set forth above, multiplied by any constant number (e.g., 10) for all players. The PAV of the football player with projected baseline fantasy points of 15.1 could be determined to be 10 divided by 15.1, or 0.662251. Likewise, if a player had a projected baseline fantasy score of 32 points, his PAV could be determined to be 10 divided by 32, or 0.3125. And if a player had a projected baseline fantasy score of 2 points, his PAV could be determined to be 10 divided by 2, or 5.0. In another example, the constant number could be the projected baseline fantasy points of the top player within a position or league. The PAV may also be the inverse of the projected baseline fantasy points but multiplied by a function or a varying number.

A PAV may be in the form of the multiplier set forth above. If the football player above with a PAV of 0.662251 scores 2 touchdowns in the game, and runs for 100 yards, he would be awarded 2×6 baseline fantasy points for the touchdowns, plus 10 baseline fantasy points for the rush yards, for a total of 22 baseline fantasy points. His 22 baseline fantasy points would be multiplied by his PAV of 0.662251, to arrive at his adjusted fantasy score of 14.569522.

In draft contests, since adjusted fantasy values can be made substantially equal by PAVs, participants may draft players based on who they predict will exceed their projected fantasy score by the largest margins. In non-draft contests, salary caps for example may not be necessary because adjusted fantasy values of real-life players can be made substantially equal by the players' PAVs. Participants may select teams and lineups after considering each real-life player's PAV as well as the player's projected baseline fantasy scores.

In another embodiment, the PAV can be determined by an average draft position (ADP). The ADPs for fantasy players are widely publicized. For example, if NFL running back Todd Gurley has an ADP of 1.1 as the consensus first overall pick in the first round of drafts, his PAV may be determined to be (1×). If Antonio Brown had the next highest ADP of 1.2 as the consensus second overall pick in the first round, his PAV may be determined to be a slightly higher PAV of (1.01×).

In yet another embodiment, the PAV can be determined by a method which gives each real-life player an incrementally lower PAV based on actual draft positions for the contest, which may be referred to as a draft method. For example, if Gurley is selected as the number 1 overall pick in a draft contest, his PAV may be determined to be (1.0×). If the next person selected was Antonio Brown, his PAV may be determined to be a slightly higher PAV such as (1.01×). The third overall selection's PAV may be (1.02×), and the fourth's PAV may be (1.11×). Thus, the PAV may follow any particular order.

In yet another embodiment, the PAV can be determined by auction. For example, the fantasy participant who bids the lowest PAV for the real-life player is assigned the player to his fantasy team at that PAV.

The PAV can also be determined by a combination of different methods, such as the projected baseline score method and the draft method.

According to one aspect, systems and methods of conducting a fantasy sport contest that participants may join are described. The fantasy sport contest allows for the selection of a baseline scoring system. For each of the real-life players, a player adjustment value (PAV) is determined for each real-life player. The contest allows for the selection by each participant of one or more real-life players to comprise the participant's fantasy team. Accumulated statistics of the real-life player during real-life games are converted into a real-life player's baseline fantasy score according to a baseline scoring system. The baseline fantasy score is adjusted according to the real-life player's PAV to produce an adjusted fantasy score of the real-life player. The adjusted fantasy score of each real-life player of each fantasy team is summed to determine a total adjusted fantasy score of each fantasy team. The team with the highest total adjusted fantasy score is declared the winner of the contest. The team with the second highest total adjusted fantasy score is awarded second place, and so forth.

FIG. 1 is a block diagram illustrating a fantasy sport contest system according to one embodiment. Referring to FIG. 1, system 100 includes, but is not limited to, one or more client systems 101-102 communicatively coupled to server 104 over network 103. Clients 101-102 may be any type of clients such as a host or server, a personal computer (e.g., desktops, laptops, and tablets), a "thin" client, a personal digital assistant (PDA), a Web enabled appliance, a mobile phone (e.g., Smartphone), or a wearable device (e.g., smartwatch), etc. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Server 104 may be located in proximity to one, both, or neither of clients 101-102. In one embodiment, clients 101-102 may include a web-based interface, web browser, or an application (also referred to as "app") that provides an interface (e.g., graphical user interface (GUI)) for a fantasy sports contest to a participant.

With continued reference to FIG. 1, server 104 may be coupled to data store 130 (e.g., a database) directly, over network 103, or over another network (not shown). As shown, data store 130 may store player statistics 131, baseline fantasy scores 132, adjusted fantasy scores 133, PAVs 134, baseline fantasy values 135 (as discussed in more detail herein below). In one embodiment, data store 130 may be installed on server 104 such that it can be accessed to retrieve or store player statistics 131, baseline fantasy scores 132, adjusted fantasy scores 133, PAVs 134, and baseline fantasy values 135.

Server 104 may include or represent any type of servers or a cluster of one or more servers (e.g., cloud servers). In one embodiment, server 104 may operate fantasy contests for clients 101-102 connected online to system 100. That is, each participant can participate in a fantasy contest by logging into their respective client (e.g., clients 101-102) communicating directly or indirectly over network 103 with server 104 hosting the contests.

In one embodiment, server 104 includes, but not limited to, a fantasy sports service engine 106 (also referred to as service logic, service module, or service unit, which may be implemented in software, hardware, or a combination thereof). Fantasy sports service engine 106 may represent a service related component configured or adapted to provide fantasy sports contests for one or more participants using clients 101-102. As shown in FIG. 1, fantasy sports service engine 106 may include statistics collection module 121, fantasy contest setup module 122, baseline score conversion module 123, baseline fantasy value determination module 124, PAV determination module 125, fantasy score adjustment module 126, fantasy contest performance module 127, and projected baseline fantasy scores collection module 128.

Statistics collection module 121 may collect historical statistics of real-life players from previous games or seasons and/or current statistics of the players from a current ongoing season, and store those statistics in data store 130 as player statistics 131. In one embodiment, the current statistics may be updated in real-time as the players accumulate new statistics during real-life games. In one embodiment, the historical and current statistics are collected from a sports league (e.g., database or website of the sports league), such as Major League Baseball (MLB), National Football League (NFL), National Basketball Association (NBA), and the like. Alternatively, the statistics may be collected from a third party vendor. In one embodiment, statistics collection module 121 may be configured to collect the statistics on a periodic basis (e.g., daily basis, or at the conclusion of every real-life game).

Fantasy contest setup module 122 may establish a baseline scoring system to convert player statistics 131 accumulated during the fantasy contest into baseline fantasy scores 132. For example, an administrator of a fantasy contest may select league rules, and setup module 122 may establish one or more baseline scoring systems in response to the selection. Such baseline scoring systems are generally well known to people skilled in the art. In one embodiment, module 122 may provide a service for participants to join a fantasy sports league and pick their fantasy team(s) (also referred to as draft). For example, in a draft contest, module 122 may provide a draft order determined by a pre-selected method, such as a lottery. Participants may select players for their fantasy team based on the draft order, though each player can only be selected by one team in the contest. After the participants have filled all roster spots on their fantasy teams with real-life players, each participant may select which of their real-life players will start and which will be assigned to the bench. Only starting players score fantasy points during the interval.

In a non-draft contest, module 122 may enable one or more participants to join contest and select their fantasy lineup from an entire pool of real-life players. That is, real-life players can be selected by an unlimited number of participants in the contest.

Baseline score conversion module 123 may retrieve or receive statistics 131 from data store 130. Based on the established baseline scoring systems, conversion module 123 may convert statistics 131 into baseline fantasy scores, and subsequently store baseline fantasy scores into data store 130 as part of baseline fantasy scores 132.

Baseline fantasy value determination module 124 may determine a baseline fantasy value for each real life player. Baseline fantasy value determination module 124 may retrieve or receive statistics from data store 130, and subsequently store baseline fantasy values into data store 130 as part of baseline fantasy values 135. In one embodiment, baseline fantasy values can be collected from a sports league (e.g., database or website of the sports league). Alternatively, baseline fantasy values may be collected from a third party vendor. In one embodiment, baseline fantasy values determination module 121 may be configured to collect baseline fantasy values on a periodic basis (e.g., daily basis, or at the conclusion of every real-life game).

PAV determination module 125 may determine a PAV (e.g., an inverse of a baseline fantasy value) to each real life player in order to make the adjusted fantasy value of each real life player more equal. PAV determination module 125 may retrieve or receive information from data store 130, baseline fantasy values from module 124, projected baseline fantasy scores collection module 128, and subsequently store PAVs into data store 130 as part of PAVs 134. In one embodiment, PAVs are collected from a sports league (e.g., database or website of the sports league). Alternatively, PAVs may be collected from a third party vendor. In one embodiment, PAV determination module 125 may be configured to collect PAVs on a periodic basis (e.g., daily basis, or at the conclusion of every real-life game).

Fantasy score adjustment module 126 may convert (or adjust) and record each real life player's baseline fantasy score into an adjusted fantasy score according to the player's PAV (as discussed in more detail herein below).

Fantasy contest performance module 127 provides ongoing fantasy sports services during a particular season, or a particular day or interval in a daily fantasy sports contest. For example, as real life players accumulate statistics during real life games, module 127 may invoke statistics collection module 121 to collect and store the accumulated statistics. Module 127 may invoke baseline score conversion module 123 to convert the accumulated statistics into baseline fantasy scores in accordance with one or more baseline scoring systems. Then, module 127 may invoke fantasy score adjustment module 126 to adjust each real life player's baseline fantasy score into an adjusted fantasy score according to the player's PAV. In one embodiment, module 127 may sum the adjusted fantasy scores of every player on the participant's team to determine the team's total adjusted fantasy score. Based on the team's total adjusted fantasy score, module 127 may rank each team, update the ranking of the team, and communicate the ranking to the participants (i.e., to clients 101-102 having a web-based interface, web browser, or an app running thereon) in the fantasy sports contest over network 103. In one embodiment, the statistics of the real-life players may also be communicated to the participants for presentation on the participants' respective client devices. At the conclusion of the contest, module 127 may determine a winner based on the team with the highest total adjusted fantasy score. Module 127 may declare the winner with a communication to the participants' respective clients (e.g., clients 101-102) over network 103.

Projected baseline fantasy scores collection module 128 may collect projected baseline fantasy scores determined based on an expected fantasy performance of the real-life player under the baseline scoring system, and store those projected baseline fantasy scores in data store 130 as projected baseline fantasy scores 136. In one embodiment, the projected baseline fantasy scores may be updated in real-time as the real-life games happen. In one embodiment, the projected baseline fantasy scores are collected from a sports league (e.g., database or website of the sports league), or from a fantasy sports database or website. Alternatively, the projected baseline fantasy scores may be collected from a third party vendor. In one embodiment, projected baseline fantasy scores module 128 may be configured to collect the baseline projected fantasy scores on a periodic basis (e.g., daily basis, or at the conclusion of every real-life game).

Figure 2:
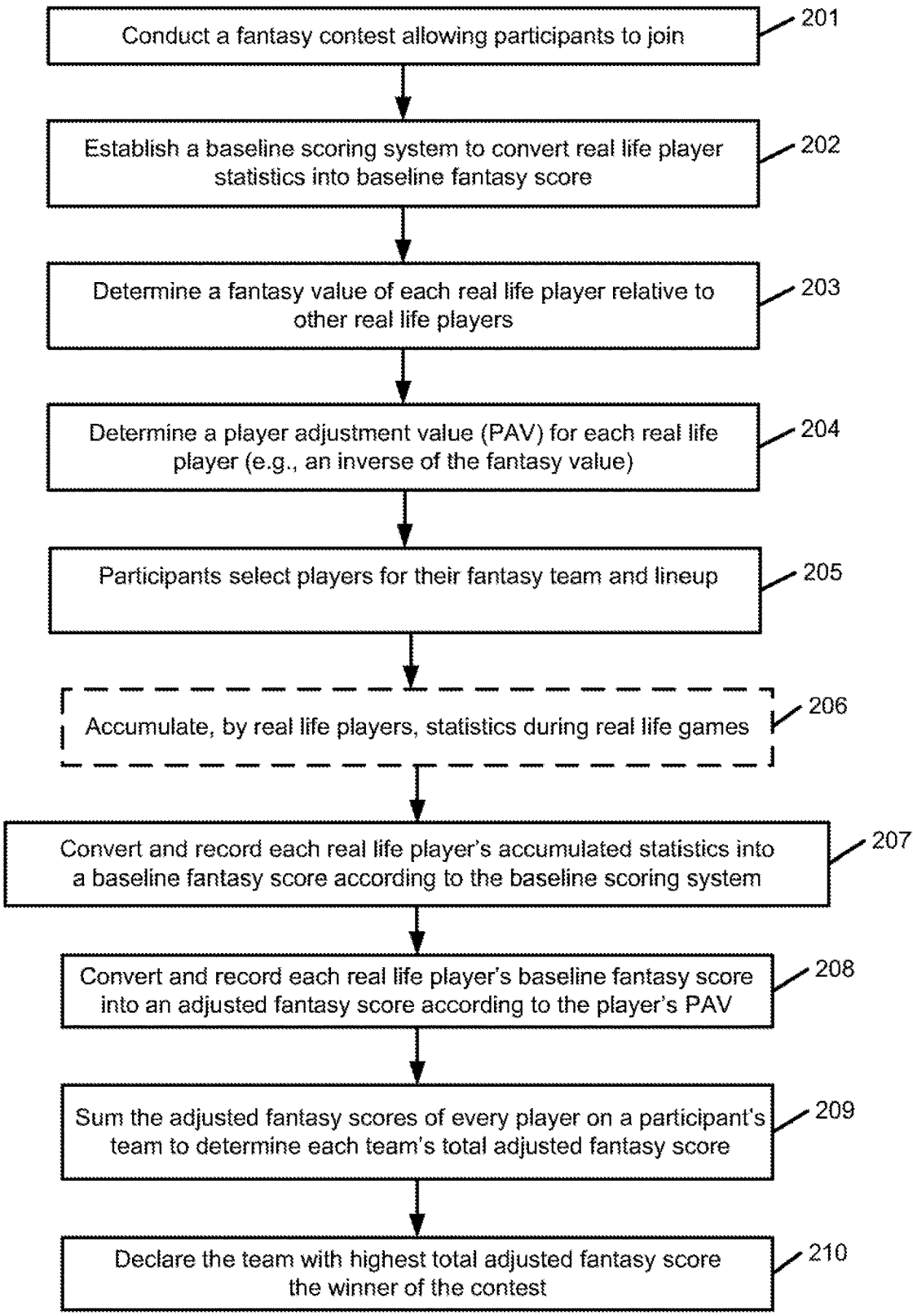
FIG. 2 is a flow diagram of a method for conducting a fantasy sports contest according to one embodiment.

FIG. 2 is a flow diagram of a method for conducting a fantasy sports contest according to one embodiment. Method 200 may be performed by processing logic that includes hardware (e.g. circuitry, dedicated logic, etc.), software (e.g., embodied on a non-transitory computer readable medium), or a combination thereof. For example, method 200 may be performed by server 104 of FIG. 1 (e.g., some or all of modules 121-128).

Referring to FIG. 2, a fantasy sport contest may be conducted (Step 201). The fantasy sport contest may allow one or more participants to compete in the fantasy contest. At step 202, a baseline scoring system is established to convert statistics of real-life players (e.g., statistics 131 of FIG. 1) into baseline fantasy scores. For example, an administrator of the contest may select league rules, and based on the selected league rules, one or more baseline scoring systems are used. At step 203, a baseline fantasy value of each real-life player relative to other real-life players is determined based on the established baseline scoring system. In one embodiment, the baseline fantasy value can be measured by projected baseline fantasy points (which may be determined based on historical statistics from previous games or seasons or other methods of assessing projected fantasy performance) or otherwise. At step 204, a player adjustment value (PAV) may be determined for each real-life player. In one embodiment, the PAV is determined for each real-life player prior to the participants selecting real-life players. The player's PAV, for example, may be inversely related to their baseline fantasy value and may serve the purpose of making the adjusted fantasy value of each real-life player more equal to one another.

At step 205, participants may select real-life players for their fantasy team and lineup. After the participants have selected their lineups, real-life players accumulate statistics during real-life games (Step 206).

Each real-life player's baseline statistics (e.g., statistics 131 of FIG. 1) are converted into a baseline fantasy score according to the established baseline scoring system and recorded (Step 207), for example to data store 130 of FIG. 1 as part of baseline fantasy scores 132. The respective PAV of each player is applied to the player's baseline fantasy score in order to convert the baseline fantasy score into an adjusted fantasy score (Step 208). The adjusted fantasy score may also be recorded into data store 130 as part of adjusted fantasy scores 133. In one embodiment, PAVs can serve the purpose of adjusting the baseline fantasy values (e.g. projected baseline fantasy score) of every real-life player to make adjusted fantasy values more equal. The respective PAV for each real-life player adjusts the baseline fantasy score for each real-life player. Accordingly, real-life players with higher PAVs become relatively more valuable from a fantasy value standpoint. On the other hand, real-life players with lower PAVs become relatively less valuable from a fantasy value standpoint. Thus, using PAVs greatly increases the number of viable options when selecting real-life players for fantasy teams or lineups because every real-life player has more equal adjusted fantasy value, as discussed further herein below.

The adjusted fantasy score for each real-life player in a participant's lineup or team is added together to determine each team's total adjusted fantasy score (Step 209). The participant with the highest total adjusted fantasy score is declared the winner of the daily fantasy contest, or interval within the seasonal fantasy contest (Step 210).

In some embodiments, a fantasy scoring system and fantasy sports game (which may be referred to as player adjustment scoring system (PASS)) adjusts each real-life player's baseline fantasy score according to the real-life player's PAV. The player adjustment scoring system can be implemented on a central server (e.g., server 104) and can be enjoyed for many fantasy sports games playable on a client device (e.g., clients 101-102) over the Internet or wirelessly against other players online.

Typically prior to the selection of players, a baseline fantasy value of each real-life player is determined. In one embodiment, the baseline fantasy value is a numerical value which can be defined as projected baseline fantasy score over the entirety of the contest. In daily fantasy contests, the entirety of the contest typically consists of a single game for each real-life player. In these daily contests, the fantasy value of each player can equal the player's projected baseline fantasy score over the single game within the contest. For seasonal fantasy contests, projected baseline fantasy points can be calculated as the total projected points for all games over the entirety of the contest, divided by the number of games.

Baseline fantasy values can be used in determining or calculating PAVs. Baseline fantasy value can be measured in many ways, including but not limited to the following: projected baseline fantasy score, average draft position, expert consensus draft position ranking, auction values, actual draft position in the current contest, salary cap figures, fantasy scores accumulated in prior games or seasons, and/or subjectively or objectively, at the discretion of the administrator of the game. Various factors can be used in determining a baseline fantasy value, including but not limited to the real player's ability, expected level of involvement, strength of opposing defense, etc.

Each player's PAV may be an inverse multiplier or function (e.g., 1/x, where x is a baseline fantasy value) to any, some, or all measures of baseline fantasy values, such as projected baseline fantasy points, auction values, average draft positions, and salary cap number, or even to one or more statistics such as a touchdown in a football fantasy contest. The PAV may be described as an inverse multiplier but it is to be understood that the PAV may be any mathematical computation applied to the baseline fantasy score, such as addition or combination of multiplication and addition.

Figure 3:
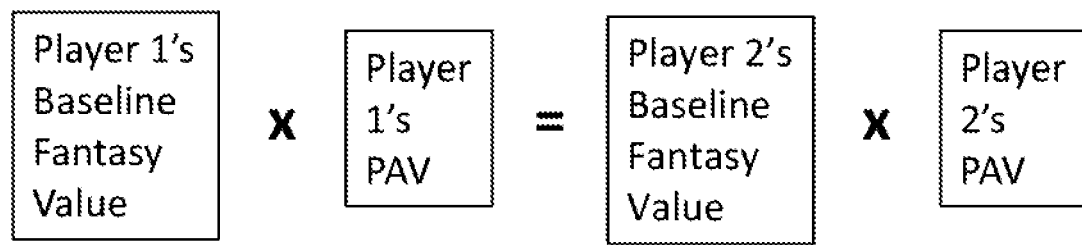
FIG. 3 is a diagram demonstrating a player adjustment value (PAV) as a multiplier that is applied to a baseline fantasy value to make each real-life player within one or more sports substantially equal according to one embodiment.
Figure 3:
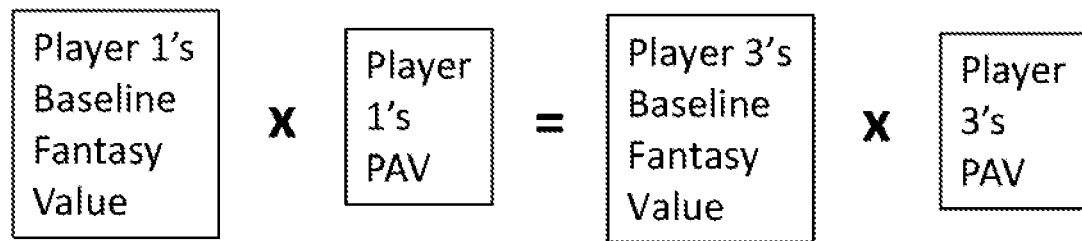
Figure 3:
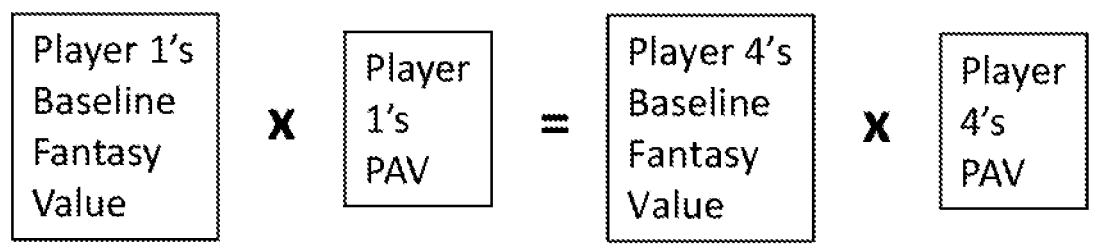
Figure 3:
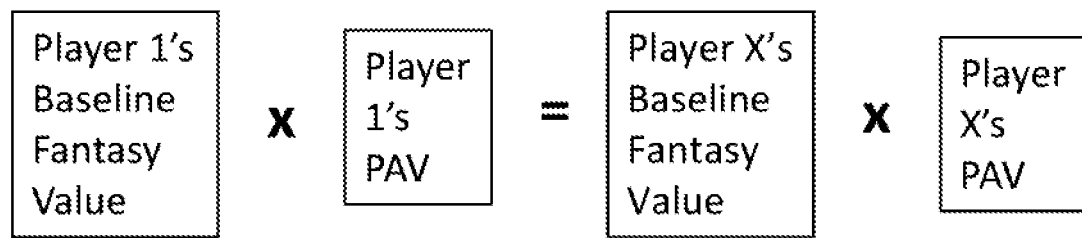

Typically, prior to the selection of players, a PAV is determined for each real-life player which may be inversely related to the player's baseline fantasy value. For example, referring to FIG. 3, the PAV may be an inverse multiplier (e.g., 1/x, where x is a baseline fantasy value) based on a baseline fantasy value of a player with the objective to make each player more equal to every other player. PAVs can increase the adjusted fantasy value weaker real-life players relative to stronger real-life players. PAVs can decrease the adjusted fantasy value of stronger real-life players relative to weaker real-life players. Relatively lower PAVs can be determined for star players projected to accumulate more statistics and thereby earning more baseline fantasy points during a contest. Relatively lower PAVs can be determined for players who are projected to score fewer baseline fantasy points. Thus, the higher a player's projected fantasy points under the baseline scoring system, the lower the player's PAV, and the lower a player's projected fantasy points, the higher the player's PAV. Accordingly, PAVs may serve to make all real-life players more equal in terms of adjusted fantasy value (e.g. projected adjusted fantasy score). For example, in football, the PAV can make players who are less likely to score touchdowns or goals or accumulate other statistics potentially just as valuable, or perhaps even more valuable, from an adjusted fantasy value standpoint compared to a player who is likely to score more touchdowns or goals, depending on each of the player's respective PAV.

Participants can take into account each player's PAV (which may be presented to the participants via participants' respective client devices) when selecting his or her fantasy team or lineup. PAV helps the fantasy team owner determine which players should be selected onto the optimal fantasy team, which players should be placed in the optimal starting lineup, as well as which players should be traded, added or dropped during the contest.

As real-life players accumulate statistics during real-life contests, each real-life player's statistics may be converted into a baseline fantasy score using a baseline scoring system or systems. The player's baseline fantasy score is then adjusted (e.g., multiplied) by the player's PAV, thereby resulting in a player's adjusted fantasy score (AFS), as shown in FIG. 4.

In one embodiment, the AFS of each player on a fantasy team are summed together to determine that fantasy team's total AFS. The team with the highest total AFS wins the fantasy contest.

In one embodiment, the PAV can take the form of any operation, such as multiplication, addition, subtraction, or division, an equation, such as a polynomial with coefficients based on certain factors, or any combination thereof. The PAV can also take the form of an algorithm that can compute the AFS by a multitude of steps. For example, a PAV may be a multiplier of 2 (2×), addition of 5 (+5), subtraction of 7 (−7), division by 2 (x/2), or a combination of a multiplier of 2 followed by an addition of a constant (2x+C), depending on how the game is set up. In one embodiment, constant C is any positive integer (e.g., 5).

Figure 5:
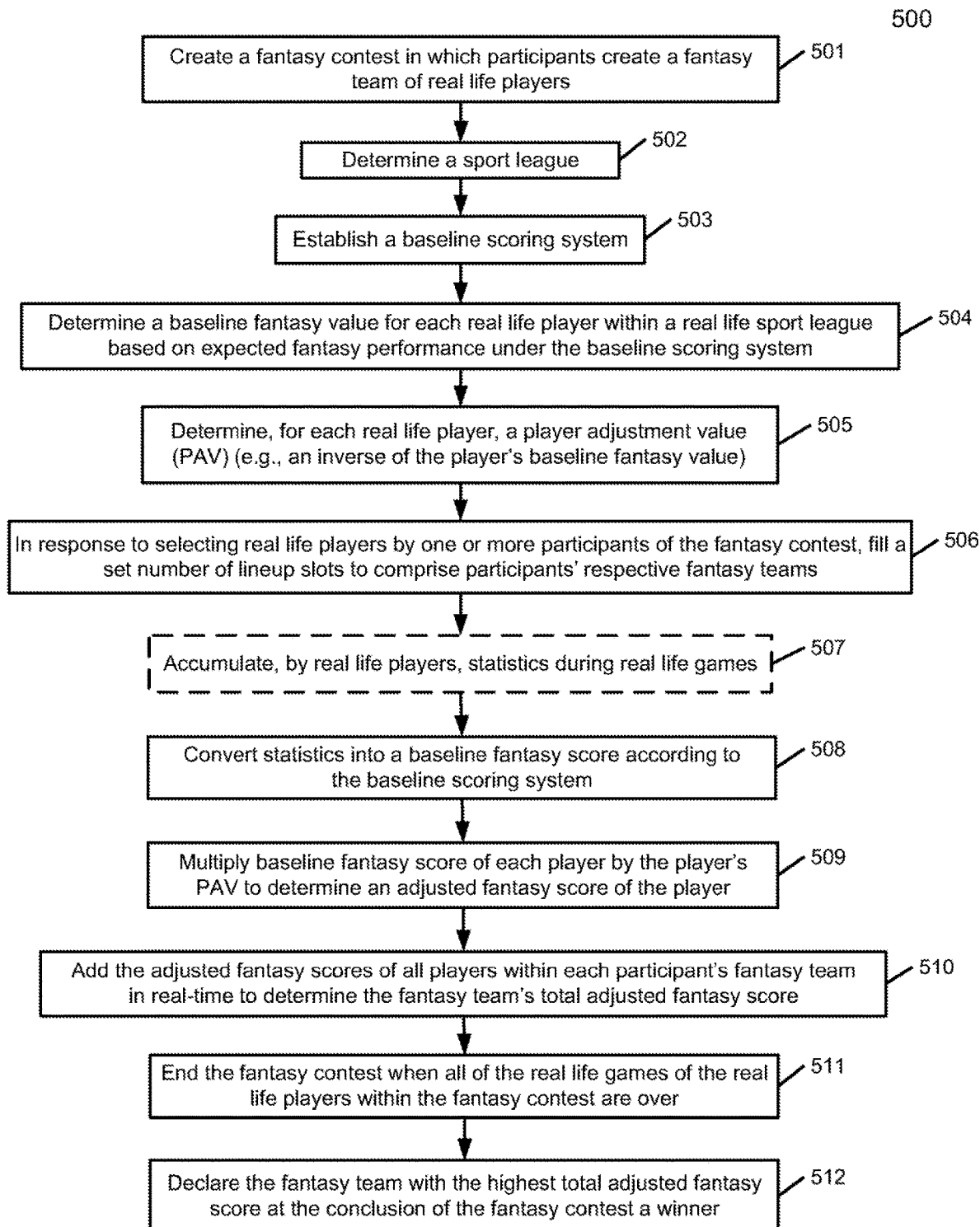
FIG. 5 is a flow diagram of a method for conducting a fantasy sports contest for a single selected sport according to one embodiment.

FIG. 5 is a flow diagram of a method for conducting a fantasy sports contest for a single selected sport according to one embodiment. Method 500 may be performed by processing logic that includes hardware (e.g. circuitry, dedicated logic, etc.), software (e.g., embodied on a non-transitory computer readable medium), or a combination thereof. For example, method 500 may be performed by server 104 of FIG. 1 (e.g., some or all of modules 121-128).

Referring to FIG. 5, in block 501, a fantasy contest allowing participants to join is created in which each participant can create a fantasy team from a pool of real-life players within a single sports league. In block 502, a sports league is determined based on a selection of the sports league by the administrator. The sports league can be, for example, NFL football, NBA basketball, NHL hockey, MLB baseball, golf, or the like. In block 503, a baseline scoring system is established. The baseline scoring system is generally well known to people skilled in the art. In block 504, a projected baseline fantasy score for each real-life player within the real-life sports league are determined based on expected fantasy performance under the selected baseline scoring system. The projected baseline fantasy score can be determined from many factors, including real-life player's ability, real-life player's expected level of involvement in the real-life game, expected weather, past performance, strength of opposing defense, injury, injury to teammates, etc. In block 505, a PAV is determined for each real life player (e.g., an inverse of the player's projected baseline fantasy score). In block 506, participants select real-life players, from a pool of real-life players within a single sport league, to comprise their respective fantasy teams. In response to selecting real life players by one or more participants of the fantasy contest, a set number of lineup slots is filled to the participants' respective fantasy teams. In block 507, the real-life players accumulate statistics during real-life games. In block 508, the statistics of each player are converted into a baseline fantasy score under the established baseline scoring system. In block 509, the baseline fantasy score of each player is multiplied by the player's PAV to convert them into an adjusted fantasy score in either real-time as the statistics increase or decrease during the real-life game, or after the real-life game ends. In block 510, the respective adjusted fantasy scores of all real-life players within each participant's fantasy team are added together in real-time during the real-life game to determine each fantasy team's total adjusted fantasy score, or after the game ends. In block 511, the fantasy contest ends after all real-life games of the real-life players within the contest are over. In block 512, the fantasy team with the highest adjusted fantasy score at the conclusion of the contest is declared a winner.

Figure 6:
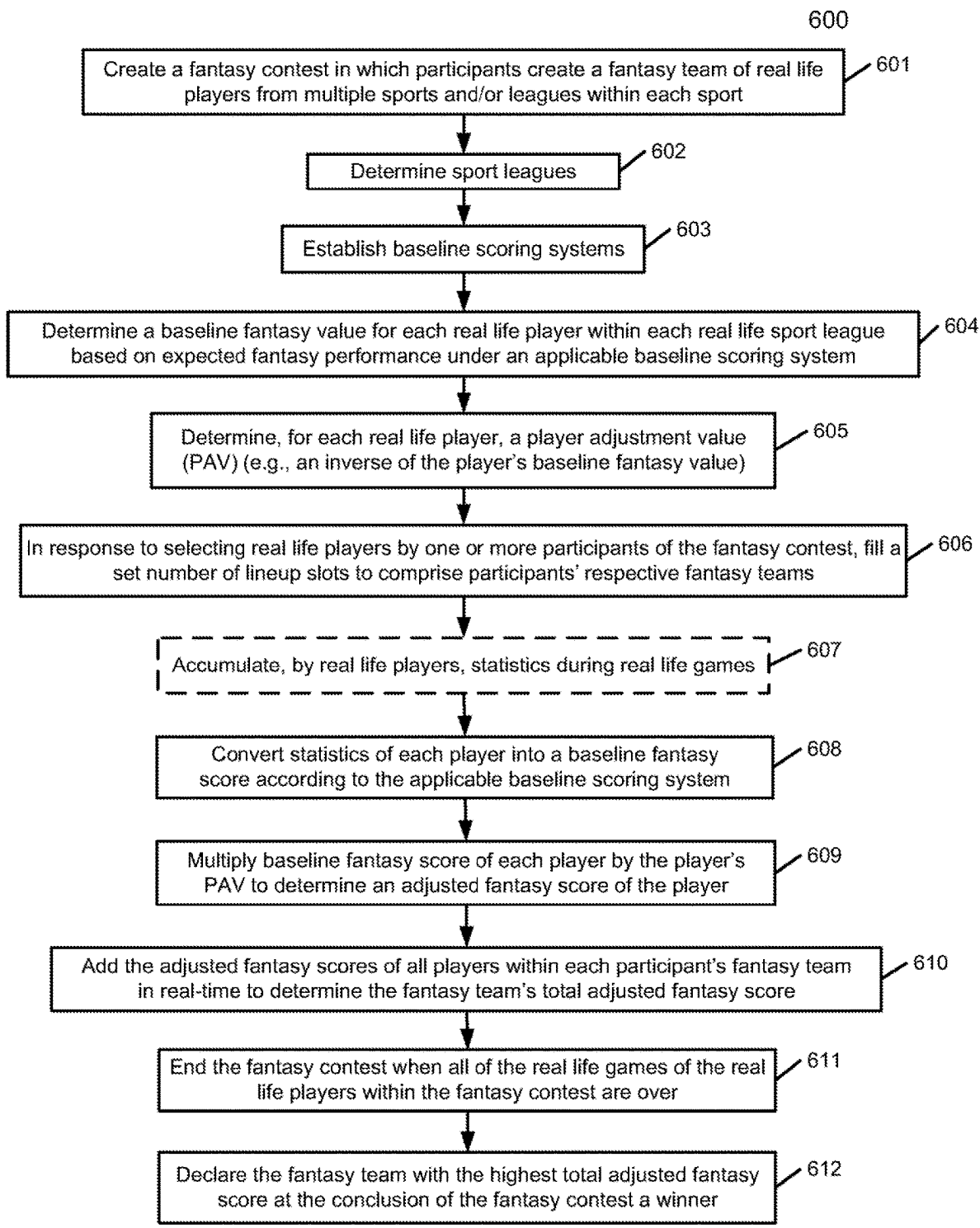
FIG. 6 is a flow diagram of a method for conducting a fantasy sports contest over a number of different sports according to one embodiment.

FIG. 6 is a flow diagram of a method for conducting fantasy sports contests over a number of different sports according to one embodiment. Method 600 may be performed by processing logic that includes hardware (e.g. circuitry, dedicated logic, etc.), software (e.g., embodied on a non-transitory computer readable medium), or a combination thereof. For example, method 600 may be performed by server 104 of FIG. 1 (e.g., some or all of modules 121-128).

Referring to FIG. 6, in block 601, a fantasy contest is created in which each participant can create a fantasy team from a pool of real-life players across multiple sports and/or leagues within each sport. In block 602, one or more sports leagues are determined based on one or more selections of the sport league(s) by the administrator. The sports league can include, for example, NFL football, NBA basketball, NHL hockey, MLB baseball, golf, or the like. In block 603, a baseline scoring system is established for one or more of the selected sports league(s). In block 604, a projected baseline fantasy score for each real-life player within the real-life sports league is determined based on expected fantasy performance under the applicable baseline scoring system for each sports league. The projected baseline fantasy score can be determined from many factors, including real-life player's ability, real-life player's expected level of involvement in the real-life game, expected weather, past performance, strength of opposing defense, injury, injury to teammates, etc. In block 605, a PAV is determined for each real-life player (e.g., an inverse of the player's projected baseline fantasy score). In block 606, participants select real-life players, from a pool of real-life players across multiple sports leagues, to comprise their fantasy team. In response to the selection of real-life players by one or more participants of the fantasy contest, a set number of lineup slots is filled to comprise the participants' respective fantasy teams. In block 607, the real-life players accumulate statistics during real-life games. In block 608, the statistics of each player are converted into a baseline fantasy score under the applicable baseline scoring system. In block 609, the baseline fantasy score is multiplied by the player's PAV to convert them into an adjusted fantasy score in either real-time as the statistics of the player increase or decrease during the real-life game, or after the real-life game ends. In block 610, the respective adjusted fantasy scores of all of the players within each participant's fantasy team are added together in real-time during the real-life game to determine each fantasy team's total adjusted fantasy score, or after the game ends. In block 611, the fantasy contest ends after all of the real-life games of the real-life players within the contest are over. In block 612, the fantasy team with the highest adjusted fantasy score at the conclusion of the contest is declared a winner.

In one embodiment, a PAV can be used to substantially equalize adjusted fantasy values of all real-life players across all sports and across all position groups by setting each player's respective PAV as a multiple equal to the inverse of the subject player's projected baseline fantasy score. For example, if Player A, an NBA basketball player, is projected to score x baseline fantasy points under a fantasy basketball baseline scoring system, his PAV would be 1/x. Thus, if the basketball player is projected to score 20 points, his PAV would be 1/20, or 0.05. Likewise, if Player B, an NFL quarterback, is projected to score 10 baseline fantasy points under the fantasy football baseline scoring system, his PAV would be 1/10, or 0.10. And if Player C, an NFL wide receiver, is projected to score 3 baseline fantasy points under the fantasy football baseline scoring system, his PAV would be 1/3, or 0.333. In the above examples, all three players would have an equal adjusted fantasy value, since each would have a projected AFS of 1.0. If the contest allows for real-life players to be selected from different sports, each sport can have its own distinct baseline scoring system that is used to determine baseline fantasy points for the contest. The PAVs will still make the adjusted fantasy values of players from different sports substantially equal.

To make gameplay more exciting and interesting, in some embodiments, every player's PAV can also be multiplied by a constant value, such as 10 or 100 to increase the player's projected AFS across the board. For example, the PAV may be a product of an inverse of the baseline fantasy points and the constant value.

Another exemplary method that can be used to substantially equalize adjusted fantasy values of all real-life players across all sports and across all position groups would be setting each player's PAV as a multiple equal to the projected fantasy score of the top overall player across all sports, divided by the subject player's projected fantasy score. For example, if the top projected fantasy scorer in the contest is Tiger Woods, a golfer who is projected to score m points under a fantasy golf baseline scoring system, then Tiger's PAV would be (m/x), where m is the number of projected points scored by the top scorer (Tiger Woods in this example) in a contest and x is the number of projected points scored by any player in the same contest, including the top projected scorer. Thus, if Tiger Woods (the top scorer in this example) is projected to score 40 points, then Tiger's PAV would be 40/40, or 1.0. In the same contest, if Kevin Durant, an NBA basketball player, is projected to score 20 baseline fantasy points under a fantasy basketball baseline scoring system, his PAV would be 40/20, or 2.0. Likewise, if Mahomes, an NFL quarterback, is projected to score 33 baseline fantasy points under the fantasy football baseline scoring system, his PAV would be 40/33, or 1.212. And if Antonio Brown, an NFL wide receiver, is projected to score 5 baseline fantasy points under the fantasy football baseline scoring system, his PAV would be 40/5, or 8.0. In the above example, all four players would have equal adjusted fantasy value in this game, since each would have a projected AFS of 1.0. If the contest allows for real-life players to be selected from different sports, each sport can have its own distinct baseline scoring system that is used to determine baseline fantasy points for the contest. The PAV will still make the adjusted fantasy values of players from different sports substantially equal.

In another embodiment, the PAV can be used to substantially equalize adjusted fantasy values of all real-life players across all position groups within a particular sport (e.g., NFL football) by setting each player's PAV as a multiple equal to the projected fantasy score of the top overall player across all position groups within the particular sport, divided by subject player's projected fantasy score. For example, if Patrick Mahomes, an NFL quarterback, is the NFL player with the highest projected fantasy score of n baseline fantasy points and NFL running back Lesean McCoy is projected to score m baseline fantasy points, then McCoy's PAV would be (n/m), where n is the number of projected points scored by the highest scorer (Mahomes in this example) in a particular sport and x is the number of projected points scored by any player in the same sport, including the highest scorer. Thus, if Mahomes (the highest projected fantasy scorer in this example) is projected to score 36 baseline fantasy points, and NFL running back Lesean McCoy is projected to score 10 baseline fantasy points, then McCoy's PAV would equal 36 divided by 10, or 3.6. Mahomes' PAV would equal 36 divided by 36, or 1.0. This method can be used to equalize adjusted fantasy values of all players across all position groups within a sport, such as NFL football. By equalizing the value of all positions, games using this method have unlimited lineup flexibility options. Whereas traditional fantasy sports games have limited position options for lineups, such as only allowing 1 quarterback, this embodiment can allow any combination of position options within the lineup, such as selecting quarterbacks for all 8 lineup slots, and the game would still be fair.

In yet another embodiment, the PAV can be used to substantially equalize adjusted fantasy values of all real-life players within a particular position group of a particular sport by setting each player's PAV as a multiple equal to the top player's projected baseline fantasy score within the subject player's position group, divided by subject player's projected baseline fantasy score. The projected AFS can be equalized within position groups, such as running backs, rather than making all players across all position groups such as running backs (RBs) and quarterbacks (QBs) equal. For example, assume Mahomes is the top QB projected to score 36 points, Philip Rivers is a mid-tier quarterback with a projected score of 20 points, Todd Gurley is the top RB projected to score 20 points, and McCoy is a mid-tier RB with a projected score of 10, then in this embodiment, the PAVs would be calculated as follows: Mahomes PAV 36/36=1.0. Rivers PAV 36/20=1.8. Gurley PAV 20/20=1.0. McCoy PAV 20/10=2.0. This method can be used to equalize all players within a particular position category, such as running back and quarterback in NFL football.

In still another embodiment, the PAV may be applied to real-life players' actual statistics rather than to the real-life player's baseline fantasy points in order to determine adjusted statistics. These adjusted statistics are then converted into baseline fantasy points. The baseline fantasy points are then summed to determine the winner of the contest. For example, if Antonio Brown's PAV is determined to be 1.75, and he accumulates 130 receiving yards in the real-life game, his 130 baseline receiving yards would be multiplied by his PAV of 1.75 to arrive at a total of 227.5 adjusted receiving yards. These adjusted receiving yards would then be run through the scoring system which awards 1 fantasy point per 10 yards as shown in table 1 above. Brown would earn 22.75 fantasy points under this example. This embodiment can be used for a variety all fantasy sport games and contests and can be used in conjunction with various types of scoring systems including total points scoring discussed above as well as category scoring systems discussed in Example 5 and Example 6 below.

The inverse relationship of the PAV to baseline fantasy value can also be direct or indirect. For example, a game with a direct relationship would attempt to make all players equally valuable fantasy assets. This can be performed prior to each contest. For example, if a Player A is expected to score 21 baseline fantasy points, and Player B is expected to score 7 baseline fantasy points, a direct relationship can be established using a PAV of (1×) for Player A and a PAV of (21/7×) or (3×) for Player B. Another direct relationship could be established by determining a PAV of (+0) for Player A and a PAV of (+(21−7)) or (+14) for Player B. As an example of yet another direct relationship, a PAV of (1×) can be determined for Player A and a PAV of 2x+7 can be determined for player B. Thus, the PAV can be determined by one or more mathematical operations. Any of these methods, in this example, would give both players an adjusted projected fantasy score of 21 points. Both players' adjusted fantasy values are now equal.

Likewise, a game with an indirect relationship would adjust fantasy scores but would only partially equalize adjusted fantasy value. For example, if Player A is expected to score 21 baseline fantasy points, and Player B is expected to score 7 baseline fantasy points, an indirect relationship could be established by determining a PAV of (1×) for Player A and (2×) for Player B. Player A is now projected to score 21 adjusted fantasy points, and Player B is now projected to score 14 adjusted fantasy points.

In another embodiment, a game with an indirect relationship would be capping PAVs at certain maximum and/or minimum values. In this version, the PAV for a real-life player with a very low projected baseline fantasy score such as 1 point would not be determined to be extremely large, such as (21×) based on the direct relationship above. This player's PAV would instead be capped at a certain value, such as 3×, 5×, etc.

In yet another embodiment, a game with an indirect relationship would be assigning PAV multipliers to players based on tiers. For example, the strongest fantasy players would be assigned to Tier 1 with a PAV of 1.0. The next tier of players who are not quite as strong would be assigned to Tier 2 with a PAV of 1.5. The next tier would be Tier 3 with a PAV of 2.0, and so forth.

In still another embodiment, a game with an indirect relationship would be using PAVs to overcompensate lesser players, such that the weaker players having high PAVs that they become more valuable than the stronger players.

In another embodiment, for example a static version of a fantasy contest, the PAVs may remain constant and are not adjusted during the course of the contest. The PAVs of every real-life players may be locked for the entire season, regardless of whether a backup becomes a star player or vice versa.

In yet another embodiment, for example a dynamic version of a fantasy contest, baseline fantasy values and PAVs may be allowed to be adjusted during the course of the contest, per the game rules established prior to the contest. In one embodiment, the PAV of each real-life player may be dynamically updated and changed after each game or interval within the contest, as the projected baseline fantasy score of a real-life player changes over the course of the contest. For example, the PAVs may be set prior to the selection of players and prior to the start of the contest. After the first game of the season, adjustments up and down may be made to each PAV based on the updated baseline fantasy value of the player over the remainder of the contest. The PAV may also be updated or changed after each game, or other interval within the contest such as a week's worth of baseball games, to reflect the change in the projected baseline fantasy score that may occur after a game/interval and before the start of the next game/interval.

In still another embodiment, the PAVs may be dynamically updated live and changed during real-life games as they happened in real-time. This embodiment may be used for daily or other live betting fantasy contests that allow participants to make substitutions to their fantasy lineups as real-life games happen in real-time.

In another embodiment, the PAVs of real-life players can be locked (i.e., static) for their respective owners at the time they are acquired by the fantasy team. The PAVs of real-life players that are fantasy free agents or on the waiver wire may be dynamically adjusted until they are rostered by a new fantasy team. Likewise, if a real-life player is traded to a new fantasy team, the PAV of the real-life player may be reassessed for the new team or remain unchanged depending on the contest rules.

Some embodiments of the disclosure can be used for a variety of fantasy sports contests and games, including but not limited to fantasy football, basketball, hockey, soccer, cycling, darts, chess, track and field, swimming, Olympics, world cup, golf, tennis, car racing, e-sports, etc. A variety of scoring formats currently in use, such as standard scoring, point per reception (PPR), half point per reception (half PPR), custom and non-custom scoring formats can implement the embodiments of the disclosure.

Figure 7:
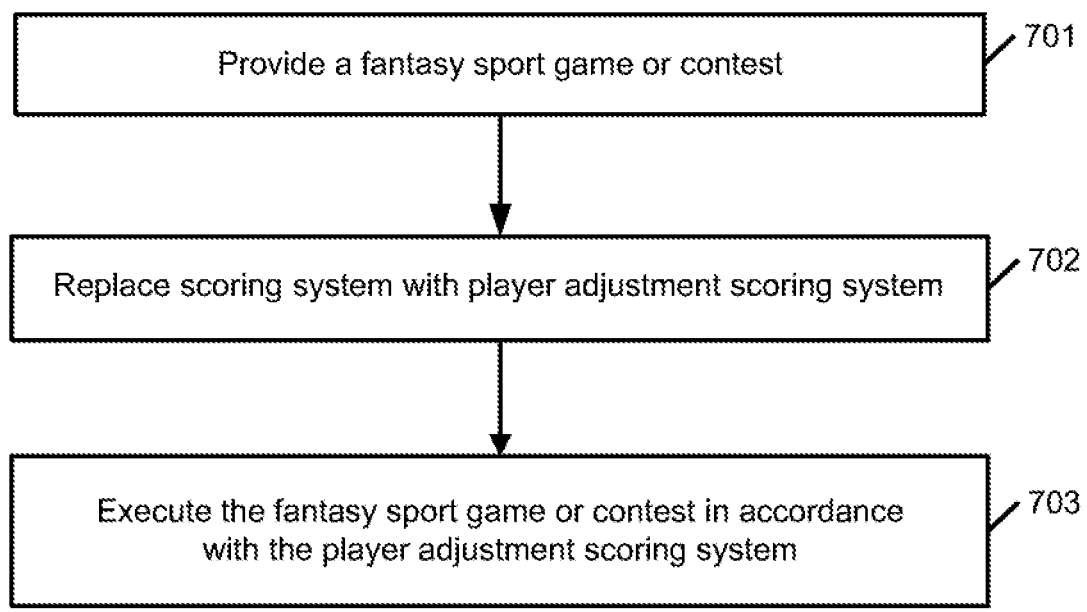
FIG. 7 is a flow diagram of a method for applying a scoring system to a fantasy contest according to one embodiment.

Some embodiments of the disclosure can also be used for Best Ball leagues and contests, described herein below. A variety of fantasy sport games, contests, and formats can implement the embodiments, which essentially changes fantasy sports games and how they are scored, as shown in FIG. 7, which is a flow diagram of a method for applying a scoring system to a fantasy contest according to one embodiment. In block 710, a fantasy sports game or contest is provided. In block 720, a default or established scoring system is replaced with a player adjustment scoring system. In block 730, the fantasy contest is executed in accordance with the player adjustment scoring system. For example, the fantasy sport game or contest may implement the player adjustment scoring system with all or at least some of the features. Fantasy sports games can also implement the player adjustment scoring system by plugging the PAV of each player into the fantasy sports game (e.g., via an application programming interface (API)) to create a new game.

In some embodiments, another fantasy sports game which may use embodiments of the disclosure is Best Ball. Best Ball involves each participant selecting a fantasy team comprised of real-life players. No players are added, dropped, or traded at any point during the contest. Only a set number of real-life players from each position group within each fantasy team have their adjusted fantasy points counted in the contest. The players with the highest adjusted fantasy scores are counted. Best Ball games with embodiments of the disclosure may be used for daily contests, seasonal contests, draft contests and non-draft contests.

In contrast to the fantasy scoring systems that add total fantasy points from accumulating statistics in various categories to determine winners of contests or matchups, some fantasy scoring systems award fantasy points for winning statistical categories or ranking highly in statistical categories. These category scoring formats are prevalent in fantasy baseball. For example, a fantasy baseball team could be awarded 10 fantasy points for finishing the contest (or interval within the contest such as a week) with the most home runs of all 10 fantasy teams in the league. The team with the second most home runs would be awarded 9 fantasy points, and so forth. For these scoring formats, which may be referred to as category scoring, in order to implement embodiments of the disclosure, PAVs may be applied to the real-life players' actual statistics rather than to the real-life player's baseline fantasy points in order to determine adjusted statistics. These adjusted statistics are then summed to determine category rankings for each fantasy team. Fantasy points are then awarded for winning or ranking high in categories based on the adjusted statistics rather than the baseline statistics. The fantasy points awarded for winning or ranking high in a certain category are not adjusted in games or contests with embodiments of the disclosure. Rather, the actual statistics of the players are adjusted by PAVs to determine adjusted statistics. The fantasy points for winning or ranking high in categories are not considered baseline fantasy points for purposes of games or scoring system with embodiments of the disclosure.

In some embodiments, PAVs may be used to adjust baseline statistics rather than to adjust baseline fantasy points. These embodiments can be applied to a variety of fantasy sports games and scoring formats. These embodiments are ideally suited for games and contests that use category scoring. Examples of these formats include but are not limited to (1) Rotisserie or Roto, (2) Head-To-Head: Each Category, and (3) Head-to-Head: Most Categories.

Figure 9:
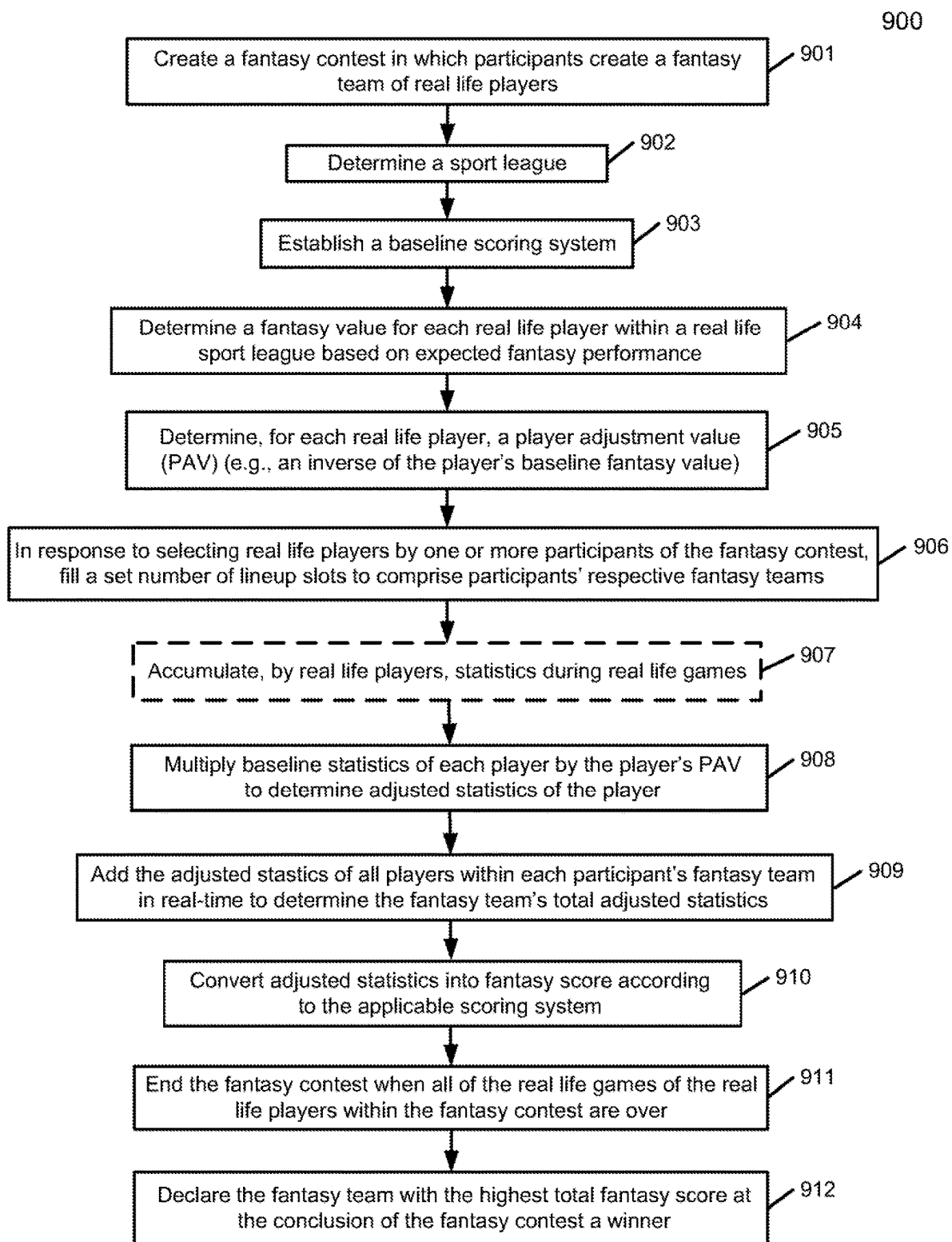
FIG. 9 is a flow diagram of a method for conducting a fantasy sports contest using PAVs to adjust statistics according to one embodiment.

FIG. 9 is a flow diagram of a method for conducting a fantasy sports contest according to one embodiment. Method 900 may be performed by processing logic that includes hardware (e.g. circuitry, dedicated logic, etc.), software (e.g., embodied on a non-transitory computer readable medium), or a combination thereof. For example, method 900 may be performed by server 104 of FIG. 1 (e.g., some or all of modules 121-128).

Referring to FIG. 9, in block 901, a fantasy contest is conducted in which each participant can create a fantasy team of real-life players within a sport league. In block 902, the sports league is determined based on a selection of the sports league by the administrator. The sports league can be, for example, NFL football, NBA basketball, NHL hockey, MLB baseball, golf, or the like. In block 903, a scoring system is established. The scoring system is generally well known to people skilled in the art. In block 904, a projected baseline fantasy score for each real-life player within the real-life sports league is determined based on expected fantasy performance. The projected baseline fantasy score can be determined from many factors, including projected statistical output, real-life player's ability, real-life player's expected level of involvement in the real-life game, expected weather, past performance, strength of opposing defense, injury, injury to teammates, etc. In block 905, a PAV is determined for each real life player (e.g., an inverse of the player's projected baseline fantasy score). In block 906, in response to selecting real life players by one or more participants of the fantasy contest, a set number of lineup slots is filled to the participants' respective fantasy teams. In block 907, the real-life players accumulate baseline statistics during real-life games. In block 908, the baseline statistics are applied to the PAV and converted into adjusted statistics in either real-time as the statistics increase or decrease during the real-life game, or after the real-life game ends. In block 909, the respective adjusted statistics of all of the players within each participant's fantasy team are added together in real-time during the real-life game to determine each fantasy team's total adjusted statistics, or after the game ends. In block 910, the adjusted statistics are converted into the fantasy score according to the applicable scoring system. For example, the applicable scoring system can be rotisserie or roto or head to head—each category, as described in detail below. In block 911, the fantasy contest ends after all of the real-life games of the real-life players within the contest are over. In block 912, the fantasy team with the highest fantasy score, based on adjusted statistics, at the conclusion of the contest is declared a winner.

Some embodiments of the disclosure can also be used to create new fantasy sports games and fantasy sports contests. For example, a daily fantasy contest in which participants can select a high number of players, such as 20 players from any position to fill their lineup. The team with the highest total AFS wins. Another daily contest would be to select one or more players to a lineup, and the team that selects the real-life player with the highest individual AFS wins. Alternatively, the top 5 (or other number) real-life players' adjusted scores could be totaled to determine the winner.

Some embodiments of the disclosure may be implemented with daily fantasy multi-sport contests or seasonal fantasy multi-sport contests allowing participants to pick a fantasy team comprised of real-life players from various sports.

Example 1—a PAV Multiplier Type in a Fantasy Football Game

If one player (Player A), is projected to score 20 baseline fantasy points, he may be assigned a PAV of (1×). If a second player (Player B) was projected to score 15 baseline fantasy points, then Player B may be assigned a slightly higher PAV, such as (1.333×). If a third player (Player C) was projected to only score 5 baseline fantasy points, Player C may be assigned a significantly higher PAV, such as (4×). Note that the PAV in this example are direct correlations to the inverse of a player's projected baseline fantasy score, which attempt to make all players exactly equal in terms of adjusted fantasy value. If all players play as they are projected to, then they would all end up with an adjusted fantasy score of 20 points. PAVs can also be set up as indirect correlations to a player's projected baseline fantasy score.

If Player A scores a rushing touchdown and runs for 80 yards in a game, he may earn 6 baseline fantasy points for the rushing touchdown, plus 8 baseline fantasy points for the 80 yards rushing, which totals 14 baseline fantasy points. His 14 baseline fantasy points are then multiplied by his PAV of (1×), thereby resulting in an adjusted fantasy score of 14 points.

If Player B scored a receiving touchdown and gained 60 yards receiving in a game, he may earn 6 baseline fantasy points for the receiving touchdown, plus 6 baseline fantasy points for the 60 receiving yards, which totals 12 baseline fantasy points. His baseline fantasy score of 12 points is then multiplied by his PAV of (1.33×), thereby resulting in an adjusted fantasy score of 16 points.

If Player C runs for 50 yards and scores no touchdown, he may earn a baseline fantasy score of 5 points for the 50 yards rushing. His baseline fantasy score of 5 points is then multiplied by his PAV of (4×), thereby resulting in an adjusted fantasy score of 20 points.

Under this scenario, even though Player C did not accumulate as many statistics or score as many baseline fantasy points as the other players, Player C outperforms Player A and B due to Player C's higher PAV.

Example 2—a PAV Addition and Subtraction Type in a Fantasy Football Game

If one player (Player A) is projected to score 25 baseline fantasy points, his PAV may be determined to be (−5). If a second player (Player B) is projected to score 15 baseline fantasy points, his PAV may be determined to be (+5). If a third player (Player C) is projected to only score 5 baseline fantasy points, Player C's PAV may be determined to be a significantly higher PAV, such as (+15).

If Player A scores a rushing touchdown and runs for 80 yards in a game, he may earn 6 baseline fantasy points for the rushing touchdown, plus 8 baseline fantasy points for the 80 yards rushing, for a total baseline fantasy score of 14 points. His baseline fantasy score of 14 points is then adjusted by his PAV of (−5), thereby resulting in an adjusted fantasy score of 9 points.

If Player B scores a receiving touchdown and gains 60 yards receiving in a game, he may earn 6 baseline fantasy points for the receiving touchdown, plus 6 baseline fantasy points for the 60 receiving yards, which totals 12 baseline fantasy points. His 12 baseline fantasy points are then added to his PAV of (+5), thereby resulting in an adjusted fantasy score of 17 points.

If Player C runs for 50 yards and scores no touchdown, he may earn 5 baseline fantasy points for the 50 yards rushing. His 5 baseline fantasy points are then added to his PAV of (+15), thereby resulting in an adjusted fantasy score of 20 points.

Under this scenario, even though Player C did not accumulate as many baseline statistics or score as many baseline fantasy points as the other players, Player C outperforms Player A and B due to Player C's higher PAV.

Example 3—a PAV Multiplier in a Fantasy Football Daily Contest

Embodiments of the disclosure may be used for daily fantasy contests. A baseline scoring system is established. The baseline scoring system can be as set forth above in Table 1, or any other baseline scoring system(s) can be used for the contest. A PAV is determined for each real-life player, typically before the participants select players and before the contest starts. The player's PAV can be based inversely on said player's projected baseline fantasy points. Participants in the contest select a lineup of real-life players, such as the following sample lineup for fantasy football: 1 Quarterback (QB); 2 Wide Receivers (WR); 2 Running Backs (RB); 1 Tight End (TE); 2 Flex Players (WR/RB/TE) or (WR/RB); and 1 Defense/Special Teams (DST). Participants can choose any real-life players to fill their lineup for that week. Once the real-life games start for the real-life player, the lineup selection can be locked in.

Each real-life player accumulates baseline fantasy points during the game which are calculated by applying a baseline scoring system to the player's statistical performance during the game. These baseline fantasy points are applied to the player's PAV and thus converted live into adjusted fantasy points. Adjusted fantasy points for the participant's team are summed up. The team with the highest adjusted fantasy point total wins the contest.

For example, suppose a team picked the following lineup of NFL real-life players, with their respective PAV listed next to each player's name below. The players then accumulate the following statistics as shown in Table 2.

TABLE 2

QB: Tom Brady; 1.1x; 2 Pass TD, 1 Interception, 3 Rushing Yards
WR: Keenan Allen; 1.7x; 1 Receiving TD, 89 Receiving Yards
WR: Antonio Brown; 1x; 154 Receiving Yards
RB: Adrian Peterson; 3.0x; 22 Rushing Yards
RB: Todd Gurley; 0.8x; 127 Rushing Yards, 2 Receiving TD's, 80 receiving yards
TE: Rob Gronkowski; 0.9x; 109 Receiving Yards, 1 Fumble Lost
Flex Player: Alvin Kamara; 2.5x; 55 Rush Yards, 1 Receiving TD, 67 Receiving Yards
Flex Player: Allen Hurns; 4.0x; 72 Receiving Yards
Defense/Special Teams Arizona Cardinals; 2.0x; 2 sacks, 24 points allowed, 411 yards allowed The Adjusted Fantasy Scores for each player would be calculated as shown in Table 3.

TABLE 3

| Player | Calculation |
|---|---|
| Brady | 2 Pass TD = 2 × 6 = 12 |
| | 1 Interception = −2 |
| | 3 Rushing Yards = 0.3 |
| | Total baseline score: 12 − 2 + 0.3 = 9.7 |
| | Total baseline score × PAV 1.1 = 10.67 AFS |
| Allen | 1 Receiving TD = 6 |
| | 89 Receiving Yards = 8.9 |
| | Total baseline score: 6 + 8.9 = 14.9 |
| | Total baseline score × PAV 1.7 = 25.33 |
| Brown | 154 Receiving Yards = 15.4 |
| | Total baseline score × PAV 1.0 = 15.4 AFS |
| Peterson | 22 Rushing Yards = 2.2 |
| | Total baseline score × PAV 3.0 = 6.6 AFS |
| Gurley | 127 Rushing Yards = 12.7 |
| | 2 Receiving TD's = 2 × 6 = 12 |
| | 80 receiving yards = 8 |
| | Total baseline score: 12.7 + 12 + 8 = 32.7 |
| | Total baseline score × PAV 0.8 = 26.16 AFS |
| Gronkowski | 109 Receiving Yards = 10.9 |
| | 1 Fumble Lost = −2 |
| | Total baseline score: 10.9 − 2 = 8.9 |
| | Total baseline score × PAV 0.9 = 8.01 AFS |
| Kamara | 55 Rush Yards = 5.5 |
| | 1 Receiving TD = 6 |
| | 67 Receiving Yards = 6.7 |
| | Total baseline score = 18.2 |
| | Total baseline score × PAV 2.5 = 45.5 AFS |
| Hurns | 72 Receiving Yards = 7.2 |
| | Total baseline score × PAV 4.0 = 28.8 AFS |
| Cardinals | 3 sacks = 3 |
| | Total baseline score × PAV 2.0 = 6 AFS |

As shown in Table 3, each player's AFS may be added together for a total team AFS of 172.47 for this participant's lineup. The team with the highest AFS would win.

Example 4—Seasonal Draft Contest Example—Head-to-Head Total Points Format

Seasonal draft contests typically involve a fantasy league comprised of a number of participants who compete against each other over the course of all or part of a sports season.

For example, a typical NFL fantasy football league may run its regular season for weeks 1-13 of the NFL season. The fantasy league's playoffs may then take place during weeks 14-16 of the NFL season. In a Head-To-Head Total Points Format, each fantasy team competes against another team each week in Head-To-Head matchups. The team with the higher point total of the 2 teams competing against each other wins that week's matchup (1-0-0). The team with the lower point total gets a loss (0-0-1). If 2 teams get the exact same score they both tie (0-1-0). The next week the teams would play against other teams in the league. The win-loss records of the teams are typically used to decide which teams make the fantasy playoffs, with total points scored or other tie breakers used, if necessary, to break a tie between 2 or more teams with identical win-loss records.

Prior to week 1, all the participants in the fantasy contest league would draft their fantasy teams. The draft involves each participant selecting real-life players to comprise each of their fantasy teams. In this format, each real-life player can only be owned by one fantasy team. The team to pick first would select who they judge to be the best or most valuable fantasy player. The team to pick second would select the best or most valuable real-life player still available, and so on, until each team has selected enough players to fill out their rosters. The roster typically includes various lineup slots assigned to certain positions as well as bench spots. After the draft, each participant selects which of their real-life players will be in their starting lineup, and which real-life players will be on the bench, prior to each fantasy sports game event or interval within the contest. The length of a seasonal fantasy contest is typically a season or majority of the season for the real-life sports league.

Some embodiments of the disclosure can be used in a draft contest. A PAV may be determined for each real-life player prior to the draft. Participants may then select real-life players by considering the baseline fantasy value of each player as well as each player's PAV. Once the season starts, real-life players become more or less likely to accumulate statistics due to various factors including injuries, performance, playing time levels, etc. As described above, PAVs may be adjusted during the course of the contest, depending on rules established prior to the contest.

Example 5—Rotisserie (Roto) Example—Fantasy Baseball

Rotisserie or Roto scoring includes a number of different statistical categories. For fantasy baseball, the offensive categories could include batting average, hits, walks, slugging percentage, home runs and stolen bases. Pitching categories could include earned run average, strikeouts, walks, WHIP (walks+hits per inning pitched), and saves. Each fantasy team in the league competes in all categories. Teams are ranked based on their performance in each category. In a 10-team league, each team is ranked 1-10 in each statistical category over a period of time (day, week, month, season) based on accumulated statistics. The team that accumulated the most home runs would rank 1st in the home runs category and would earn 10 points. The team with the second most home runs would earn 9 points, and so on. Points are then totaled for all categories to determine an overall score for each team, which gives each team a league rank.

For Roto games, embodiments of the disclosure can be used in different ways:

First, each real-life player's statistics may be adjusted across all categories. For example, if Player A has a PAV of (1.5×), and Player A hit 0.250 with 10 home runs, 15 stolen bases, and 0.500 slugging percentage, the AFS for this player would be 0.375 with 15 home runs, 22.5 stolen bases and a 0.750 slugging percentage.

Second, PAVs may only be applied to only certain statistical categories, such as using a player's PAV to adjust the number of the player's home runs and stolen bases, but not other categories, such as batting average and slugging percentage.

Third, each player's statistical categories may be adjusted separately. For example, for a real-life player who stole many bases, but did not hit many home runs, a low stolen base PAV such as (1.1×) may be determined, and a high home run PAV such as (3.5×) may be determined. Adjustments may be made to each of the player's statistical categories based on separate PAVs for each category.

Example 6—Head-to-Head: Each Category Example—Fantasy Baseball

Head-To-Head: each category formats in fantasy baseball utilize the same approach as Roto described above. Rather than ranking teams based on the accumulation of statistics over the entire season, Head-To-Head has 2 fantasy teams against each other over the course of a shorter period, such as a week's worth of baseball games. If Team A has 9 home runs and Team B has 6 home runs during the week they play each other, Team A gets 1 point for winning the home run category. Team B gets 0 points for the home run category.

Points are added for each category and the team with the most points wins the matchup. If the teams have equal points because they win an equal number of categories, this would result in a tie. Win-loss records over the course of the season are then used to rank teams and determine which teams make the fantasy playoffs.

Embodiments of the disclosure may be used for Head-To-Head: each category in the same manner as described above under Rotisserie. Instead of summing baseline statistics to determine the winner of each category, statistics may be adjusted using a PAV for each player. The adjusted statistics would then be used to determine the winner of the category.

To illustrate, Team A's and Team B's rosters of real-life players, PAVs, actual statistics, and adjusted statistics for the week is shown in Table 4 below:

TABLE 4

Smith: PAV 1.5x; 1 HR, 3 Hits, 2 SB; (AFS = 1.5 HR, 4.5 Hits, 3 SB)
Cruz: PAV 1.2x; 0 HR, 4 Hits, 1 SB; (AFS = 0 HR, 4.8 Hits, 1.2 SB)
Jones: PAV 1.1x; 2 HR, 6 Hits, 0 SB; (AFS = 2.2 HR, 6.6 Hits, 0 SB)
Peterson: PAV 1.0x; 1 HR, 2 Hits, 1 SB; (AFS = 1 HR, 2 Hits, 1 SB)
Jeter: PAV 1.2x; 0 HR, 1 Hit, 0 SB; (AFS = 0 HR, 1.2 Hits, 0 SB)
Dell: PAV 2.0x; 0 HR, 3 Hits 2 SB; (AFS = 0 HR, 6 Hits, 4 SB)
Sum Total AFS for Team A: 4.7 HR, 25.1 Hits, 9.2 SB
Encarnacion: PAV 1.4x; 1 HR, 2 Hits, 0 SB; (AFS = 1.4 HR, 2.8 Hits, 0 SB)
Rivera: PAV 1.2x; 2 HR, 3 Hits, 0 SB; (AFS = 2.4 HR, 3.6 Hits, 0 SB)
Judge: PAV 0.9x; 3 HR, 6 Hits, 0 SB; (AFS = 2.7 HR, 5.4 Hits, 0 SB)
Einhorn: PAV 1.8x; 0 HR, 1 Hit, 0 SB; (AFS = 0 HR, 1.8 Hits, 0 SB)
Murphy: PAV 1.4x; 0 HR, 4 Hits, 2 SB; (AFS = 0 HR, 5.6 Hits, 2.8 SB)
Webb: PAV 1.7x; 1 HR, 3 Hits, 0 SB; (AFS = 1.7 HR, 5.1 Hits, 0 SB)
Sum Total AFS for Team B: 8.2 HR, 24.3 Hits, 2.8 SB)

In this contest, Team B wins the HR category since 8.2 HR is higher than 4.7 HR, and is awarded 1 point for the category. Team A wins the Hits category since 25.1 Hits is higher than 24.3 Hits, and is awarded 1 point for the category. Team A wins the SB category since 9.2 SB is higher than 2.8 SB, and is awarded 1 point for the category. Team A wins this Head-To-Head matchup 2 to 1. Thus, Team A gets a win (1-0-0), and Team B gets a loss (0-0-1).

Example 7—Fantasy Baseball Season Point Total Contest

Fantasy baseball games can use season point totals to determine the winner. Points are assigned to each category prior to the season. For example, a single can be worth 1 point, a double can be worth 2 points, a triple 3 points, a home run 4 points, an RBI 1 point, a stolen base 2 points. In one embodiment, the PAV may be determined for each real-life player inversely to their baseline fantasy value. The number of points each player accumulates for each statistic may be adjusted by the player's PAV to determine adjusted points for the player. The team with the highest adjusted points at the end of the season wins the contest.

Example 8—Fantasy Soccer Season Point Total Contest

Fantasy soccer games can use season point totals to determine the winner. Points are assigned to each category prior to the season. For example, a goal can be worth 4 points, an assist 3 points, a shutout by a goalkeeper or defender 2 points. In one embodiment, for each real-life player a PAV is determined that is inversely related to the player's baseline fantasy value. The number of points each player accumulates for each statistic may be adjusted by the player's PAV to determine adjusted points for the player. The team with the highest adjusted points at the end of the season wins the contest.

Example 9—Daily Contest

Daily contests may allow for a large or unlimited number of participants. All participants select a lineup of real-life players to comprise their fantasy team. The same real-life players can be selected by an unlimited number of teams. The lineups for these contests are determined by the administrator of the contest and can be made flexible in terms of the number of lineup slots, the position(s) allowed for each lineup slot, and even the sport(s) allowed for each lineup slot. The flexibility of these contests allows for a large number of lineup slots, as well as significantly more variance in players appearing in lineups and lends itself to large numbers of participants, which is very marketable in the daily fantasy contest industry.

Embodiments of the disclosure allow many more real-life players to be valuable to fantasy teams. Since lesser players are given higher PAVs, their adjusted fantasy value is increased. The larger number of players makes draft contests fairer by taking away the advantage that teams have if they draft from an early position. Increasing the number of valuable players also allows for more flexibility in lineup and roster choices and allows for the expansion of participants in draft contests (e.g., 32 participants instead of the 12 to 14 maximum participants in standard leagues) without affecting the fairness or playability of the contest.

Moreover, higher PAVs result in relatively higher adjusted fantasy scores for weaker real-life players. Lower PAVs result in relatively lower adjusted fantasy scores for stronger real-life players. In other words, each real-life player's adjusted fantasy value can be made substantially equal. The challenge for the fantasy team owner is selecting players that they believe will player better than expected, rather than players that are expected to play at their usual level of performance. More specifically, another layer of skill in determining which players to select after accounting for their PAV may be added. The participants must determine whether each player's PAV is accurate, or too high or too low, and whether the player is valuable based on a function of their projected output and PAV. No longer can participants rely on widely publicized player rankings or widely publicized projected fantasy points for each player. Some embodiments of the disclosure essentially measure the extent to which each real-life player (and each fantasy team) overperforms or underperforms expectations, which is a useful measure of the skill, knowledge, and foresight of the fantasy sports participants.

Some embodiments of the disclosure also increase the size of the useable player pool by making lesser real-life players substantially equal in adjusted fantasy value to better real-life players. The use of PAVs results in real-life players being made more equal in terms of their adjusted fantasy value or projected adjusted fantasy score. This solves the problem of the scarcity of star players or valuable players by making a larger number of players more equal in terms of their projected adjusted fantasy scores.

The increased number of real-life players who are fantasy viable makes the fantasy contest fairer, more complex, and more interesting. Since embodiments of the disclosure increase the number of real-life players who are fantasy relevant, the fantasy team owner's knowledge and skill required to succeed in a game is also increased. More relevant fantasy players result in more possible lineup combinations, and more interesting games and matchups. Introducing player adjusted scoring also adds another level of skill and knowledge to determine which players a fantasy sports game participant should draft, trade, add, drop, or activate in one's fantasy team lineup.

The significantly increased size of the viable player pool also allows for draft contest leagues to include many more participating teams. Tripling the number of fantasy relevant real-life players would in turn triple to potential number of teams that may play in the same draft contest.

The larger viable player pool also allows teams to consist of much bigger lineups. Existing fantasy sports games typically limit a fantasy football lineup to 1 QB, 2 RB, 3 WR, 1 TE, 1 DST and 1 Kicker. Embodiments of the disclosure significantly increase a viable fantasy player pool, thereby allowing fantasy teams to easily double or triple the number of player positions in an active lineup without having some of the players scoring insignificant fantasy points as they would in a traditional fantasy sports game.

Some embodiments of the disclosure allow for greater lineup flexibility in terms of combinations of positions and sports within fantasy contests because it can be used to equalize players across position groups and across different sports. Some embodiments of the disclosure allow participants in a contest to select their fantasy lineup from any position(s), and any sport(s).

For daily fantasy leagues and contests, some embodiments of the disclosure allow daily contests to be run without requiring salary caps, allow for more divergence in scores and more variety in lineups, and make it possible for an extremely high fantasy team point score if a fantasy sports game participant selects statistically low scoring players with high multipliers, and it so happens that a number of these statistically low scoring players score a lot of baseline points in a particular contest. Thus, some embodiments of the disclosure essentially measure the extent to which each player overperforms or underperforms versus their expectations (e.g. projected baseline fantasy points).

Some embodiments of the disclosure make fantasy contests more exciting by allowing for bigger scoring plays which allows for bigger comebacks and keeps contests open or relevant throughout the contest. For example, if a real-life player with a high PAV of (5×) scores a 99-yard rushing touchdown, this equals 15.9 fantasy points×5, or 79.5 adjusted fantasy points in one play. Adjusted player scoring allows for huge, dramatic comebacks, adding to the excitement and fun of the fantasy sports game.

In some embodiments, PAV can be used in non-draft contests, with the advantage that participants can pick any real-life players they want without salary cap restrictions. This in turn creates more variations in participants' fantasy teams. A participant could load up their team with all the biggest stars, and it would still be fair to the other participants. The contest would still be fair even if another participant picked much weaker real-life players because the weaker real-life players would have higher PAVs.

Many people only enjoy cheering for real life players on their favorite sports team. Some embodiments of the disclosure allow such sports purists to enjoy fantasy sports by letting them choose all players from their favorite team (e.g., New York Giants), and still be a potentially viable contender due to the PAVs balancing the scores of the lesser players.

Some embodiments of the disclosure open up many possibilities as far as playing different players or combinations of players in fantasy contests. For example, PAVs can be used to equalize real-life players' adjusted fantasy values across position groups and across sports. This would allow a team of all quarterbacks to play a contest versus all running backs or tight ends or any combination thereof.

Note that some or all of the components as shown and described above (e.g., modules 121-128 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
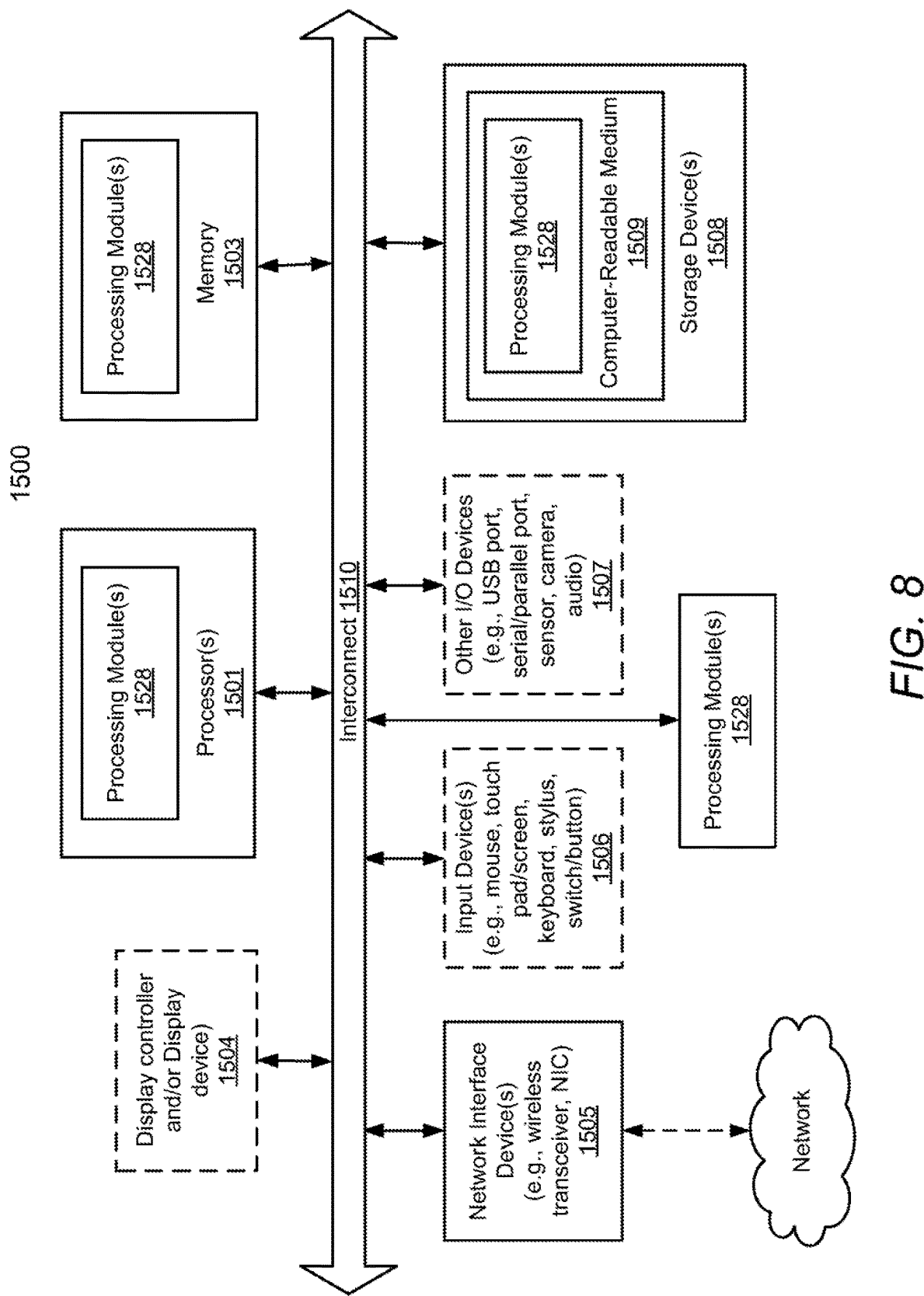
FIG. 8 is a block diagram illustrating a data processing system according to one embodiment.

FIG. 8 is a block diagram illustrating an example of a data processing system which may be used with one embodiment. For example, system 1500 may represent any of data processing systems described above (e.g., clients 101-102, server 104 of FIG. 1) performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows operating system from Microsoft °, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example modules 121-128, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/ logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A method of scoring for a fantasy contest, comprising:
   determining, by at least one server, a baseline fantasy value for a real-life player in a player pool, the player pool comprised of real-life players available for selection by a fantasy contest participant, the baseline fantasy value indicative of a projected fantasy score of the real-life player;
   determining, by the at least one server, a player adjustment value (PAV) for the real-life player, the PAV being a value such that application of the PAV to the baseline fantasy value of the real-life player would result in an adjusted fantasy value of the real-life player, the PAV determined to make adjusted fantasy values for at least some of the real-life players in the player pool more equal; and
   determining, by the at least one server, an adjusted fantasy score of the real-life player based on statistics of the real-life player accumulated during at least one real-life game, a baseline scoring system, and the PAV.

2. The method of claim 1, wherein determining, by the at least one server, the adjusted fantasy score of the real-life player based on statistics of the real-life player accumulated during at least one real-life game, the baseline scoring system, and the PAV, comprises converting statistics of the real-life player accumulated during at least one real-life game into a baseline fantasy score according to the baseline scoring system and applying the determined PAV of the real-life player to the baseline fantasy score of the real-life player.

3. The method of claim 1, further comprising determining baseline fantasy values for a plurality of other real-life players in the player pool, the baseline fantasy values indicative of projected fantasy scores of the other real-life players.

4. The method of claim 3, wherein baseline fantasy values for at least some of the other real-life players are equal to their adjusted fantasy values.

5. The method of claim 3, further comprising determining, by the at least one server, a player adjustment value (PAV) for at least some of the other real-life players, the PAV for each of the at least some of the other real-life players being a value such that application of the PAV to a baseline fantasy value of a one of the other real-life players would result in an adjusted fantasy value of the one of the other real-life players, each PAV determined to make adjusted fantasy values for at least some of the real-life players in the player pool more equal.

6. The method of claim 1, wherein the statistics of the real-life player accumulated during the at least one real-life game are statistics in a predetermined statistical category.

7. The method of claim 1, further comprising determining a further PAV for the real-life player, and wherein determining the adjusted fantasy score of the real-life player is further based on the further PAV, with the PAV applied to statistics of a first category accumulated during the at least one real-life game and the further PAV applied to statistics of a second category accumulated during the at least one real-life game.

8. The method of claim 1, wherein the baseline fantasy value is determined by a game administrator.

9. The method of claim 1, wherein the PAV for the real-life player is determined by a game administrator.

10. The method of claim 1, wherein the PAV for the real-life player is set prior to the start of the contest.

11. The method of claim 1, wherein the PAV for the real-life player may be adjusted during the fantasy contest.

12. The method of claim 1, wherein baseline fantasy value is determined prior to a start of the fantasy contest.

13. The method of claim 1, wherein the PAV for the real-life player remains constant during the fantasy contest.

14. The method of claim 1, wherein one or more baseline scoring systems are used in determining the baseline fantasy value.

15. The method of claim 1, wherein the PAV is a multiplier.

16. The method of claim 1, wherein the adjusted fantasy score is used in determining results of the fantasy contest.

17. A data processing system, comprising:
one or more processors; and
a memory coupled to the one or more processors to store instructions, which when executed by the processor, cause the processor to perform operations, the operations comprising:
determining, by at least one server, a baseline fantasy value for a real-life player in a player pool, the player pool comprised of real-life players available for selection by a fantasy contest participant, the baseline fantasy value indicative of a projected fantasy score of the real-life player;
determining, by the at least one server, a player adjustment value (PAV) for the real-life player, the PAV being a value such that application of the PAV to the baseline fantasy value of the real-life player would result in an adjusted fantasy value of the real-life player, the PAV determined to make adjusted fantasy values for at least some of the real-life players in the player pool more equal; and
determining, by the at least one server, an adjusted fantasy score of the real-life player based on statistics of the real-life player accumulated during at least one real-life game, a baseline scoring system, and the PAV.

18. The data processing system of claim 17, wherein determining the adjusted fantasy score of the real-life player based on statistics of the real-life player accumulated during at least one real-life game, the baseline scoring system, and the PAV, comprises converting statistics of the real-life player accumulated during at least one real-life game into a baseline fantasy score according to the baseline scoring system and applying the determined PAV of the real-life player to the baseline fantasy score of the real-life player.

19. The data processing system of claim 17, wherein the operations further comprise determining baseline fantasy values for a plurality of other real-life players in the player pool, the baseline fantasy values indicative of projected fantasy scores of the other real-life players.

20. The data processing system of claim 19, wherein baseline fantasy values for at least some of the other real-life players are equal to their adjusted fantasy values.

21. The data processing system of claim 19, wherein the operations further comprise determining a player adjustment value (PAV) for at least some of the other real-life players, the PAV for each of the at least some of the other real-life players being a value such that application of the PAV to a baseline fantasy value of a one of the other real-life players would result in an adjusted fantasy value of the one of the other real-life players, each PAV determined to make adjusted fantasy values for at least some of the real-life players in the player pool more equal.

22. The data processing system of claim 17, wherein the statistics of the real-life player accumulated during the at least one real-life game are statistics in a predetermined statistical category.

23. The data processing system of claim 17, wherein the operations further comprise determining a further PAV for the real-life player, and wherein determining the adjusted fantasy score of the real-life player is further based on the further PAV, with the PAV applied to statistics of a first category accumulated during the at least one real-life game and the further PAV applied to statistics of a second category accumulated during the at least one real-life game.

24. The data processing system of claim 17, wherein the baseline fantasy value is determined by a game administrator.

25. The data processing system of claim 17, wherein the PAV for the real-life player is determined by a game administrator.

26. The data processing system of claim 17, wherein the PAV for the real-life player is set prior to the start of the contest.

27. The data processing system of claim 17, wherein the PAV for the real-life player may be adjusted during the fantasy contest.

28. The data processing system of claim 17, wherein baseline fantasy value is determined prior to a start of the fantasy contest.

29. The data processing system of claim 17, wherein the PAV for the real-life player remains constant during the fantasy contest.

30. The data processing system of claim 17, wherein one or more baseline scoring systems are used in determining the baseline fantasy values.

31. The data processing system of claim 17, wherein the PAV is a multiplier.

32. The data processing system of claim 17, wherein the adjusted fantasy score is used in determining results of the fantasy contest.

33. A method of conducting a fantasy contest for one or more participants to join, comprising:
for each of the one or more participants, receiving, by at least one server over a network from a plurality of clients, a selection of one or more real-life players to comprise a fantasy team of the participant;
for at least one of the one or more real-life players:
determining, by the at least one server, a baseline fantasy value of the real-life player, the baseline fantasy value indicative of a projected fantasy score of the real-life player,
determining, by the at least one server, a player adjustment value (PAV) for the real-life player based on the baseline fantasy value of the real-life player, the PAV determined to make adjusted fantasy values for at least some of the real-life players more equal,
converting, by the at least one server, statistics of the real-life player accumulated during real-life games into a baseline fantasy score according to a baseline scoring system, and
adjusting, by the at least one server, the baseline fantasy score of the real-life player according to the determined PAV to produce an adjusted fantasy score of the real-life player.

34. The method of claim 33, further comprising summing, by the at least one server, the adjusted fantasy score of the one or more real-life players for each fantasy team to determine a total adjusted fantasy score of each fantasy team.

35. The method of claim 34, wherein baseline fantasy values for at least some of the real-life players are equal to their adjusted fantasy values.

36. The method of claim 33, further comprising:
   declaring a one of the fantasy teams having a highest total adjusted fantasy score a winner of the fantasy contest.

37. The method of claim 33, wherein the adjusted fantasy score is used in determining results of the fantasy contest.

38. The method of claim 33, further comprising summing, by the at least one server, the adjusted fantasy score of at least one of the one or more real-life players and the adjusted fantasy score of at least one of the other one or more real-life players, for each fantasy team to determine a total fantasy score of each fantasy team, the adjusted fantasy score of the at least one of the other one or more real-life players being equal to their baseline fantasy score.

* * * * *